US009756171B2

(12) United States Patent
Kim et al.

(10) Patent No.: US 9,756,171 B2
(45) Date of Patent: Sep. 5, 2017

(54) MOBILE TERMINAL AND CONTROL METHOD THEREFOR

(71) Applicant: LG ELECTRONICS INC., Seoul (KR)

(72) Inventors: Sujin Kim, Seoul (KR); Jungbin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/026,524

(22) PCT Filed: Sep. 4, 2014

(86) PCT No.: PCT/KR2014/008341
§ 371 (c)(1),
(2) Date: Mar. 31, 2016

(87) PCT Pub. No.: WO2015/105257
PCT Pub. Date: Jul. 16, 2015

(65) Prior Publication Data
US 2016/0248900 A1 Aug. 25, 2016

(30) Foreign Application Priority Data
Jan. 10, 2014 (KR) .................. 10-2014-0003520

(51) Int. Cl.
*H04M 1/72* (2006.01)
*H04M 1/725* (2006.01)
(Continued)

(52) U.S. Cl.
CPC ...... *H04M 1/72566* (2013.01); *G06F 3/0482* (2013.01); *G06F 3/0485* (2013.01);
(Continued)

(58) Field of Classification Search
None
See application file for complete search history.

(56) References Cited

U.S. PATENT DOCUMENTS

2010/0022225 A1* 1/2010 Benger ................ G06Q 10/109
455/414.1
2010/0250497 A1* 9/2010 Redlich .................. F41H 13/00
707/661
(Continued)

FOREIGN PATENT DOCUMENTS

EP 2290925 8/2010
KR 10-2006-0093204 8/2006
(Continued)

OTHER PUBLICATIONS

PCT International Application No. PCT/KR2014/008341, Notification of Transmittal of the International Search Report dated Jan. 9, 2015, 3 pages.
(Continued)

*Primary Examiner* — Diane Mizrahi
(74) *Attorney, Agent, or Firm* — Lee, Hong, Degerman, Kang & Waimey

(57) ABSTRACT

The present invention relates to a method for controlling a mobile terminal, the method comprising the steps of: detecting an occurrence of an event related to an operation of a terminal; identifying whether a schedule coinciding with the occurrence time of the detected event is stored in a calendar; and as a result of the identification, when the schedule coinciding with the occurrence time of the event is stored in the calendar, linking the event-related information with the corresponding schedule of the calendar.

16 Claims, 27 Drawing Sheets

(51) Int. Cl.
  *G06F 3/0481* (2013.01)
  *G06F 3/0482* (2013.01)
  *G06F 3/0484* (2013.01)
  *G06F 3/0485* (2013.01)
  *G06F 3/0488* (2013.01)
  *G06Q 10/10* (2012.01)

(52) U.S. Cl.
  CPC ...... *G06F 3/04817* (2013.01); *G06F 3/04842* (2013.01); *G06F 3/04845* (2013.01); *G06F 3/04883* (2013.01); *G06Q 10/1095* (2013.01); *H04M 1/72522* (2013.01); *H04M 1/72597* (2013.01)

(56) References Cited

U.S. PATENT DOCUMENTS

2012/0254785 A1    10/2012    Nakajo
2013/0036369 A1*   2/2013     Mitchell ................ G06Q 50/00
                                                        715/753
2013/0050220 A1    2/2013     Kim et al.
2016/0248900 A1*   8/2016     Kim .................. H04M 1/72522

FOREIGN PATENT DOCUMENTS

| KR | 10-2009-0090573 | 8/2009 |
| KR | 10-2012-0026395 | 3/2012 |
| KR | 10-2013-0024490 | 3/2013 |
| KR | 10-2014-0001520 | 1/2014 |
| WO | 2012092654      | 7/2012 |

OTHER PUBLICATIONS

European Patent Office Application Serial No. 14877639.6, Search Report dated Feb. 16, 2017, 8 pages.

* cited by examiner

[FIG. 1]
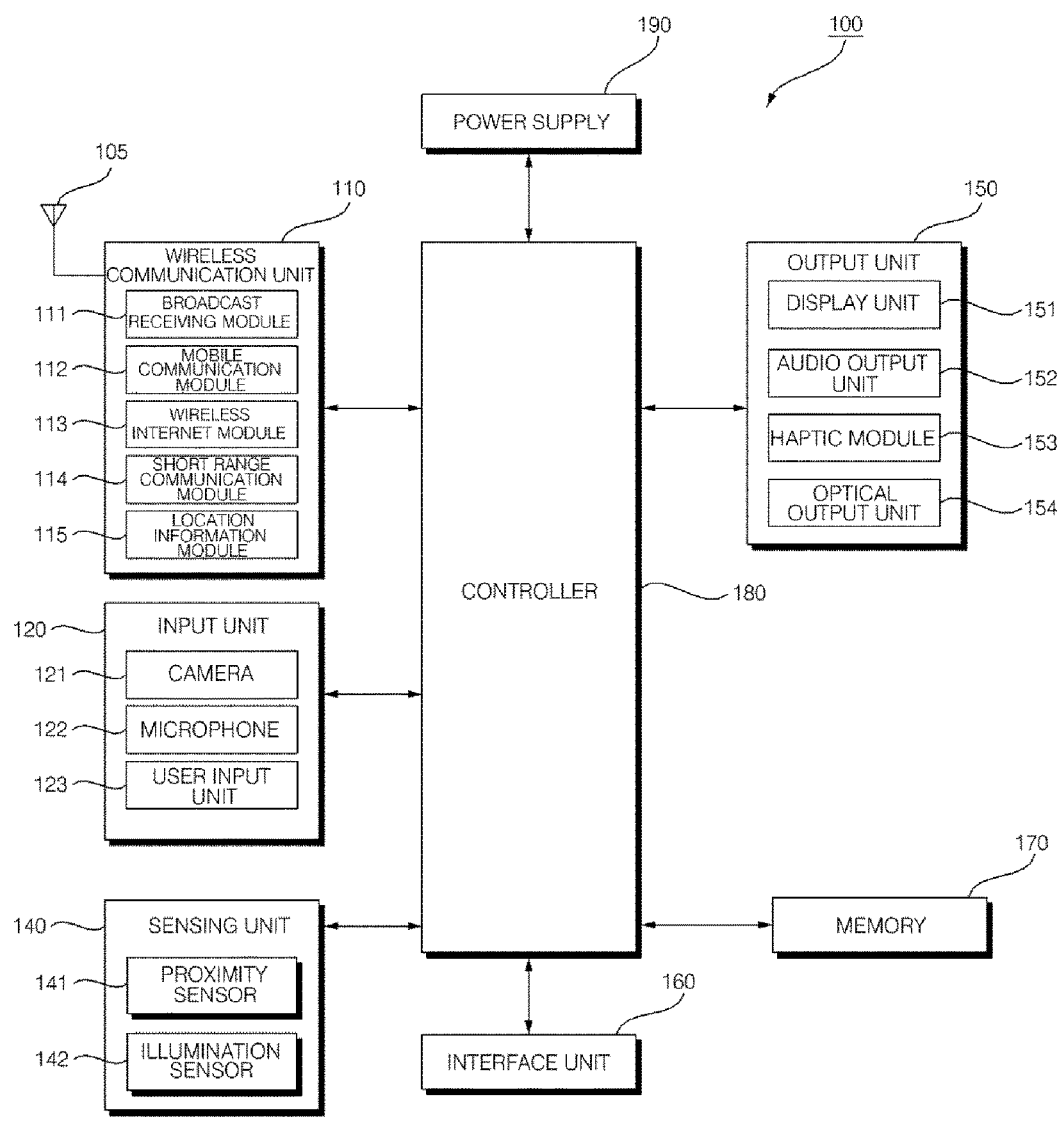

[FIG. 2]
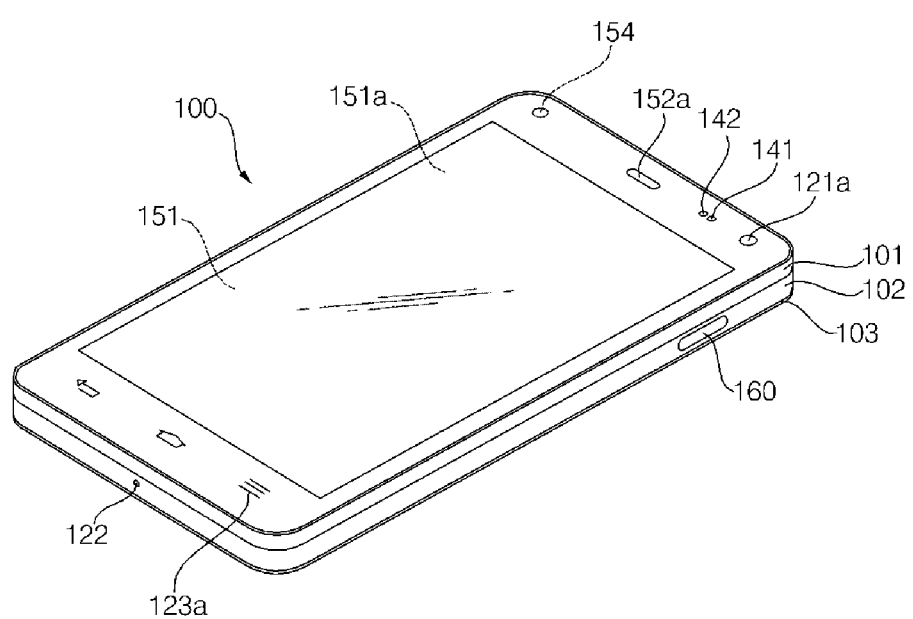

[FIG. 3]
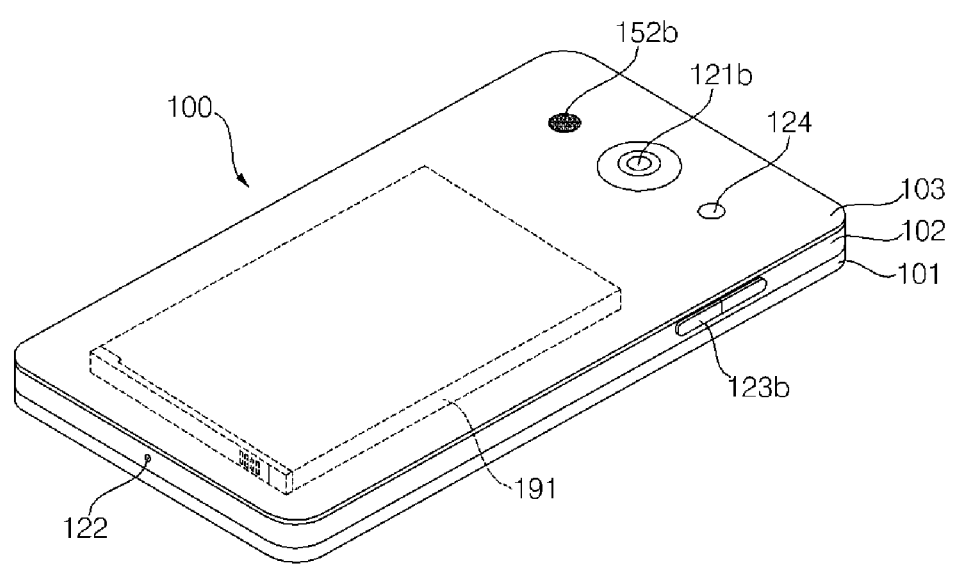

[FIG. 4]
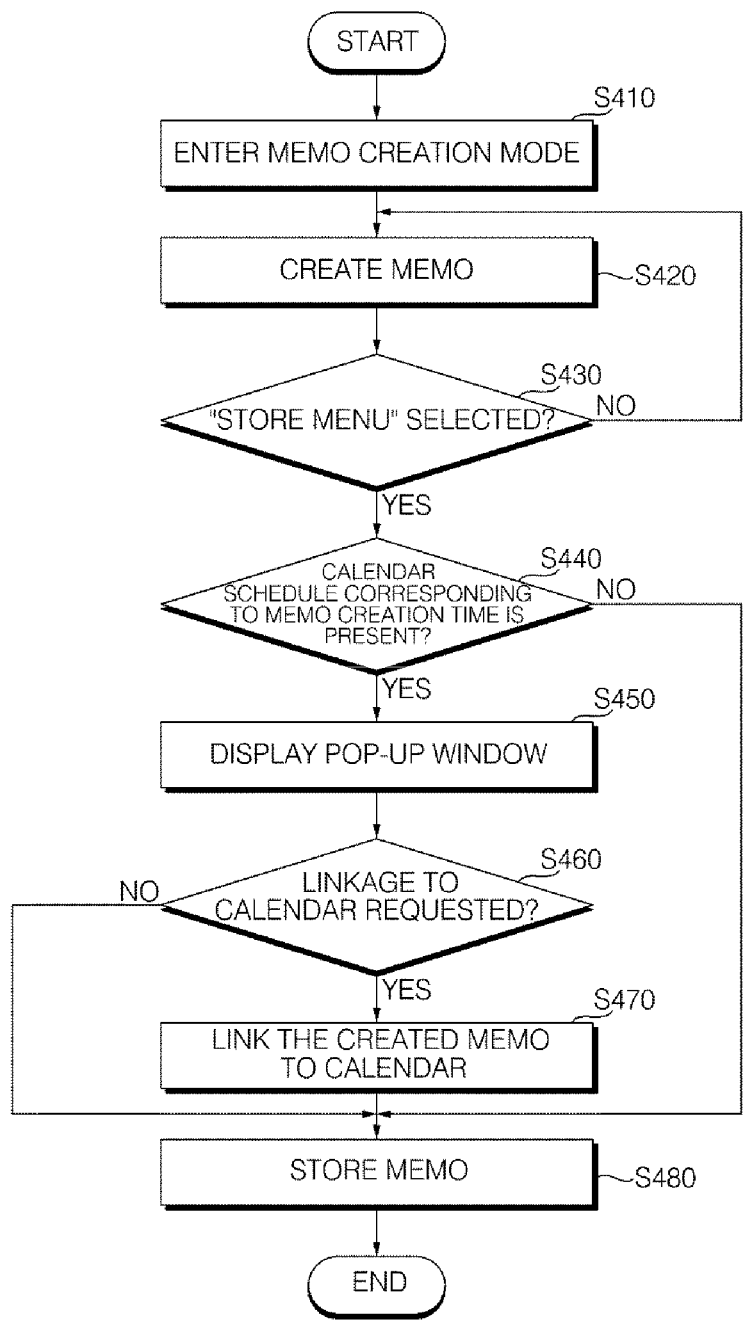

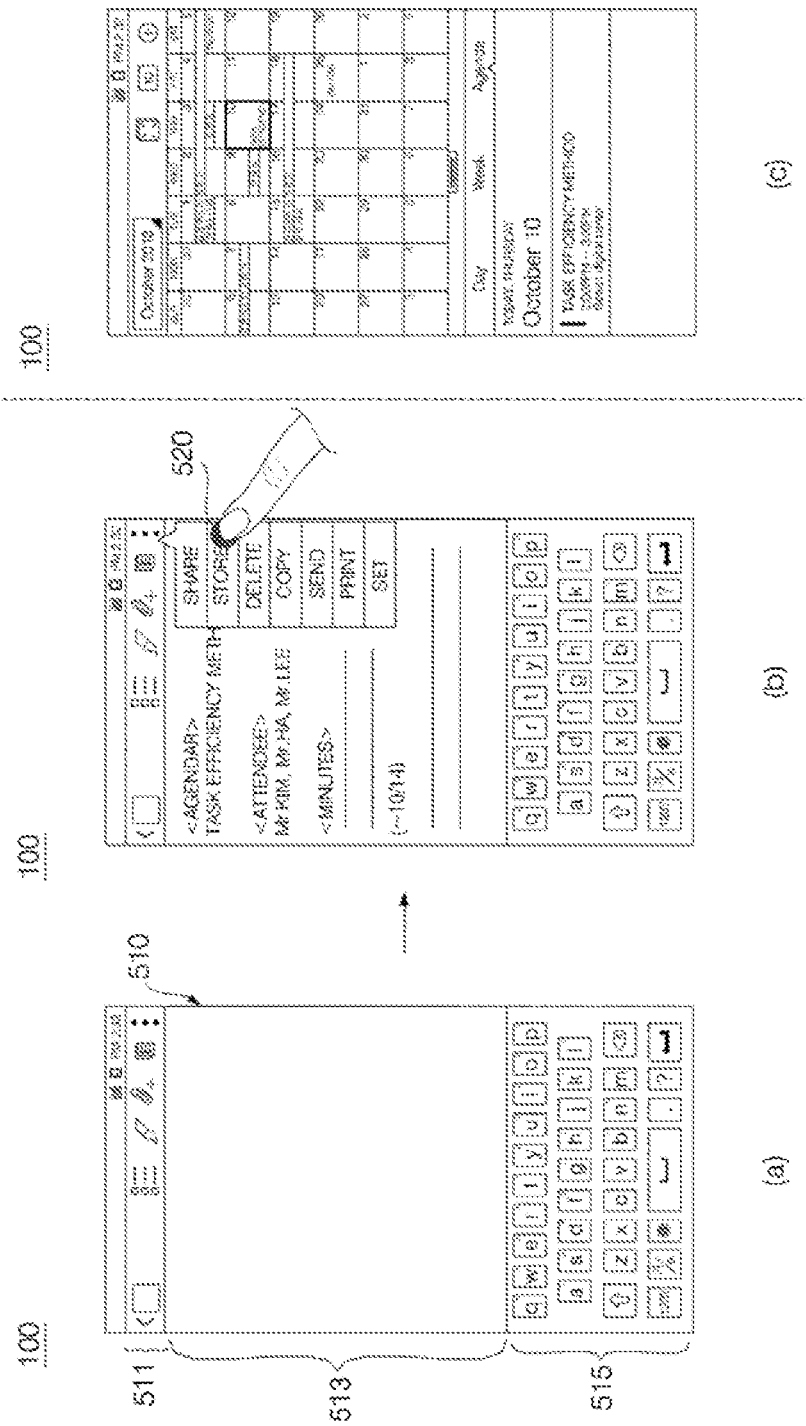
[FIG. 5]

[FIG. 6]
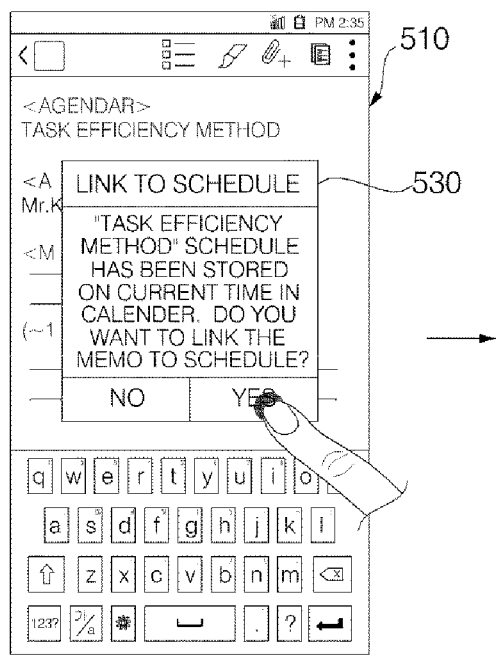
(a)
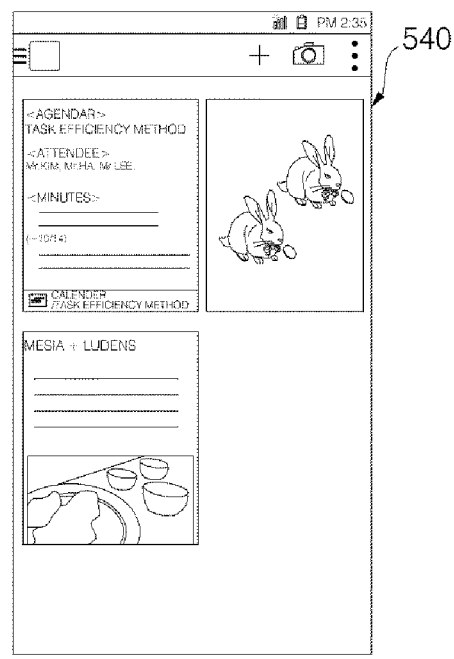
(b)

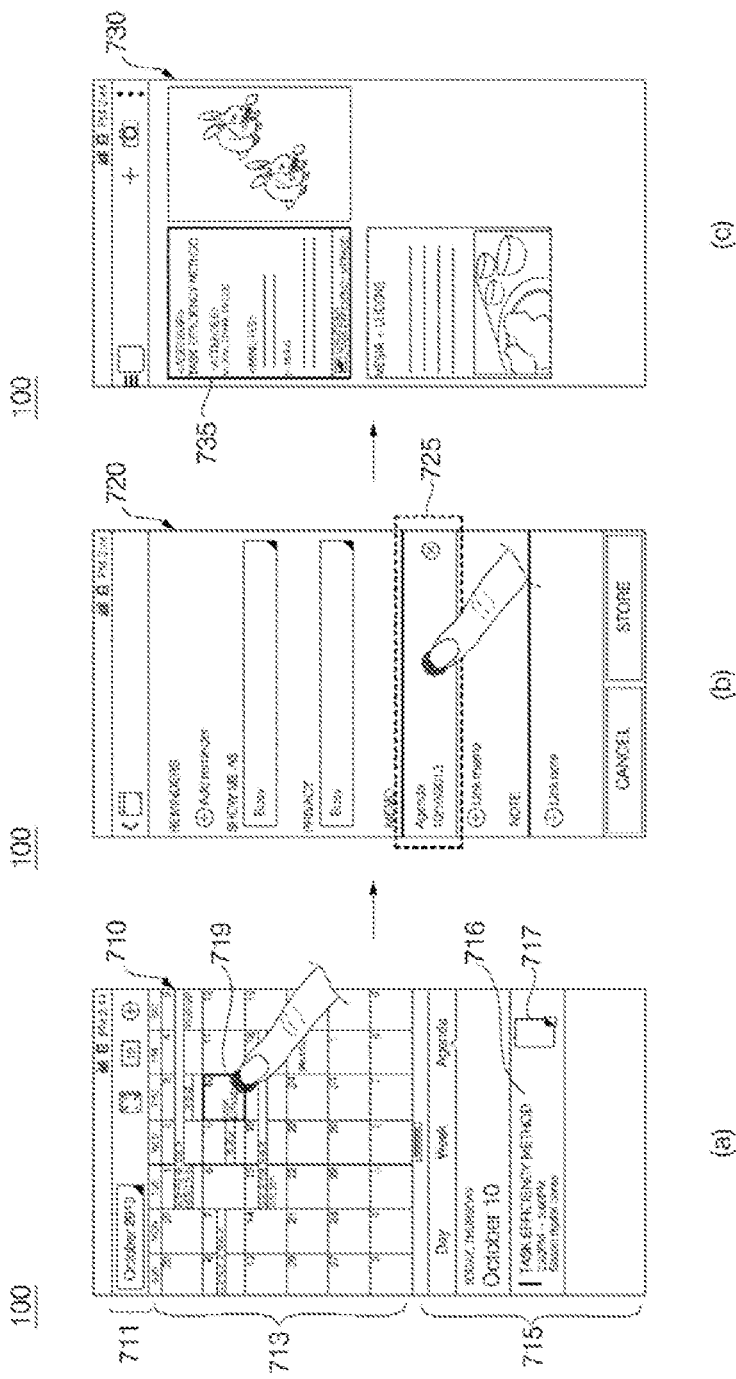
[FIG. 7]

[FIG. 8]
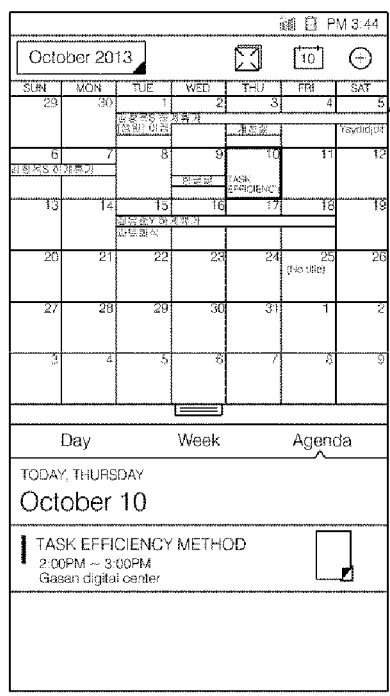
(a)
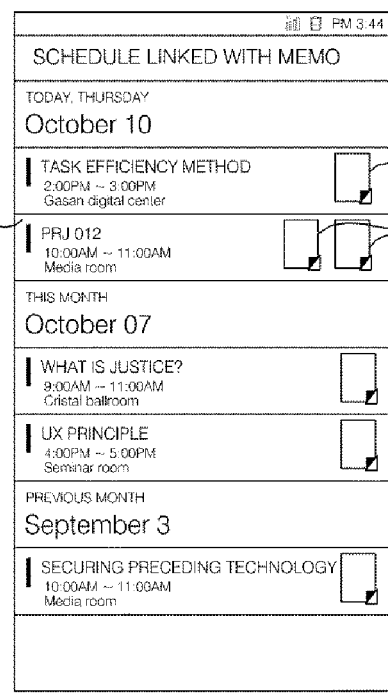
(b)

[FIG. 9]
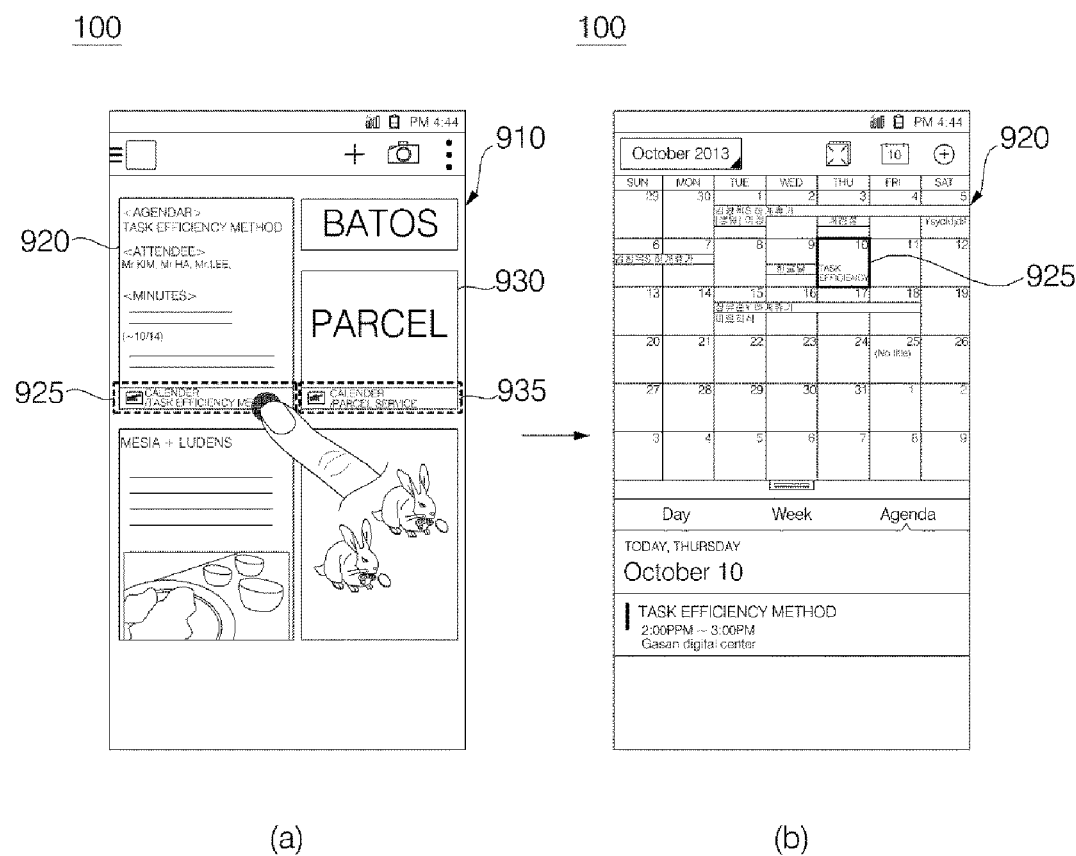
(a)          (b)

[FIG. 10]
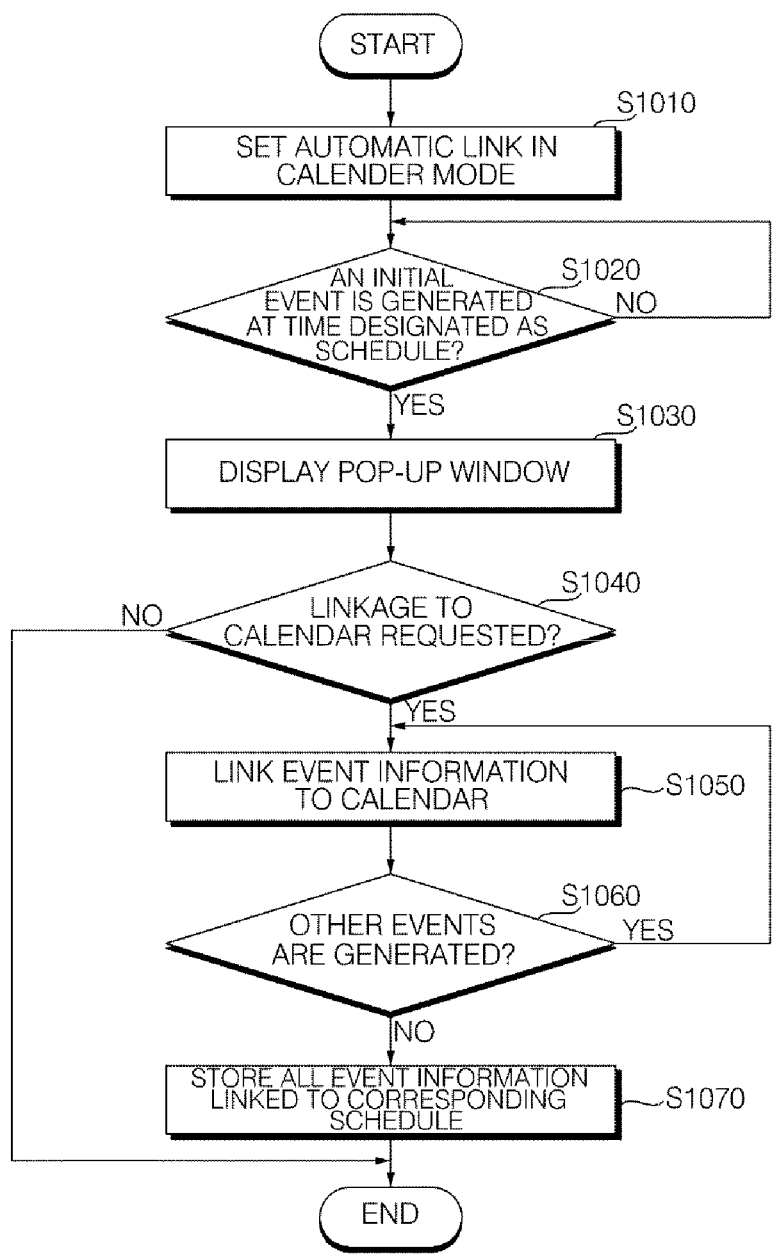

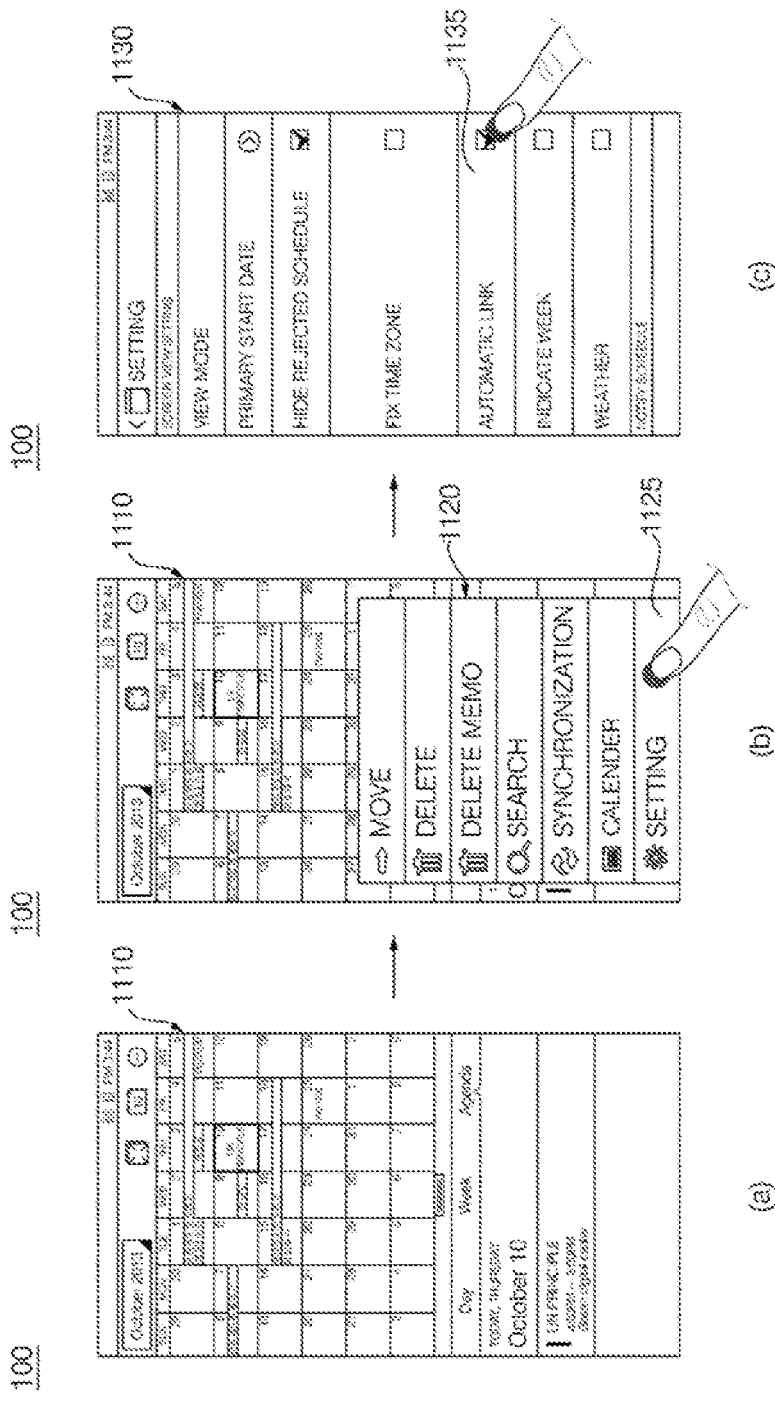
[FIG. 11]

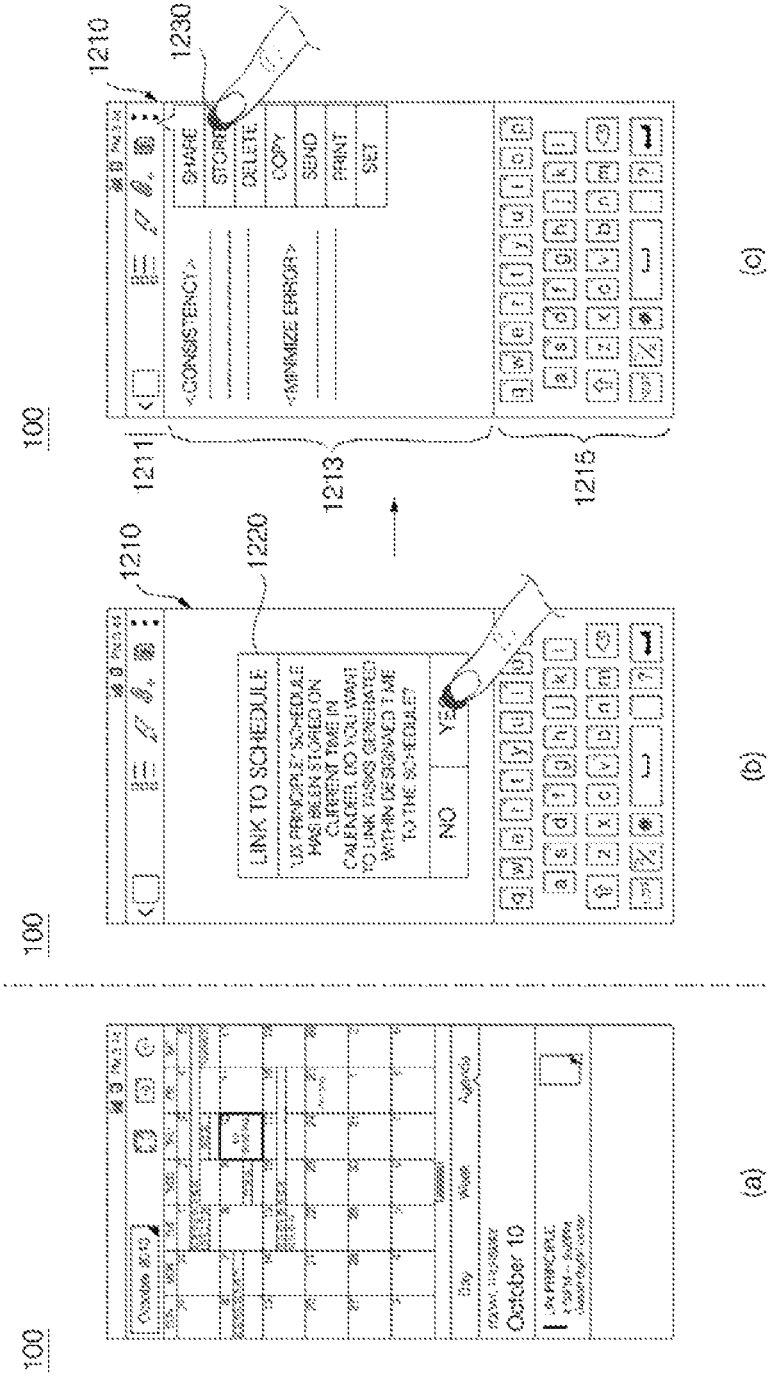
[FIG. 12]

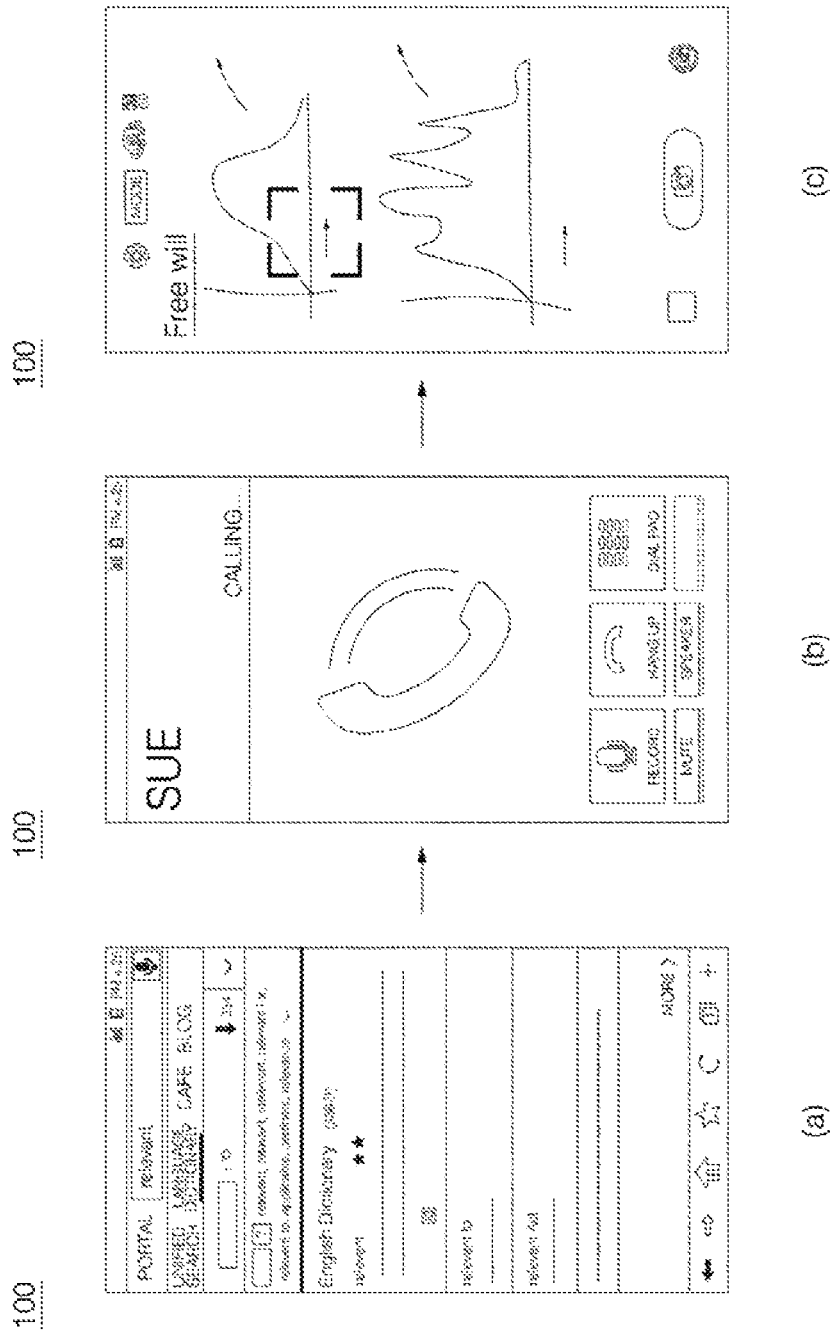
[FIG. 13]

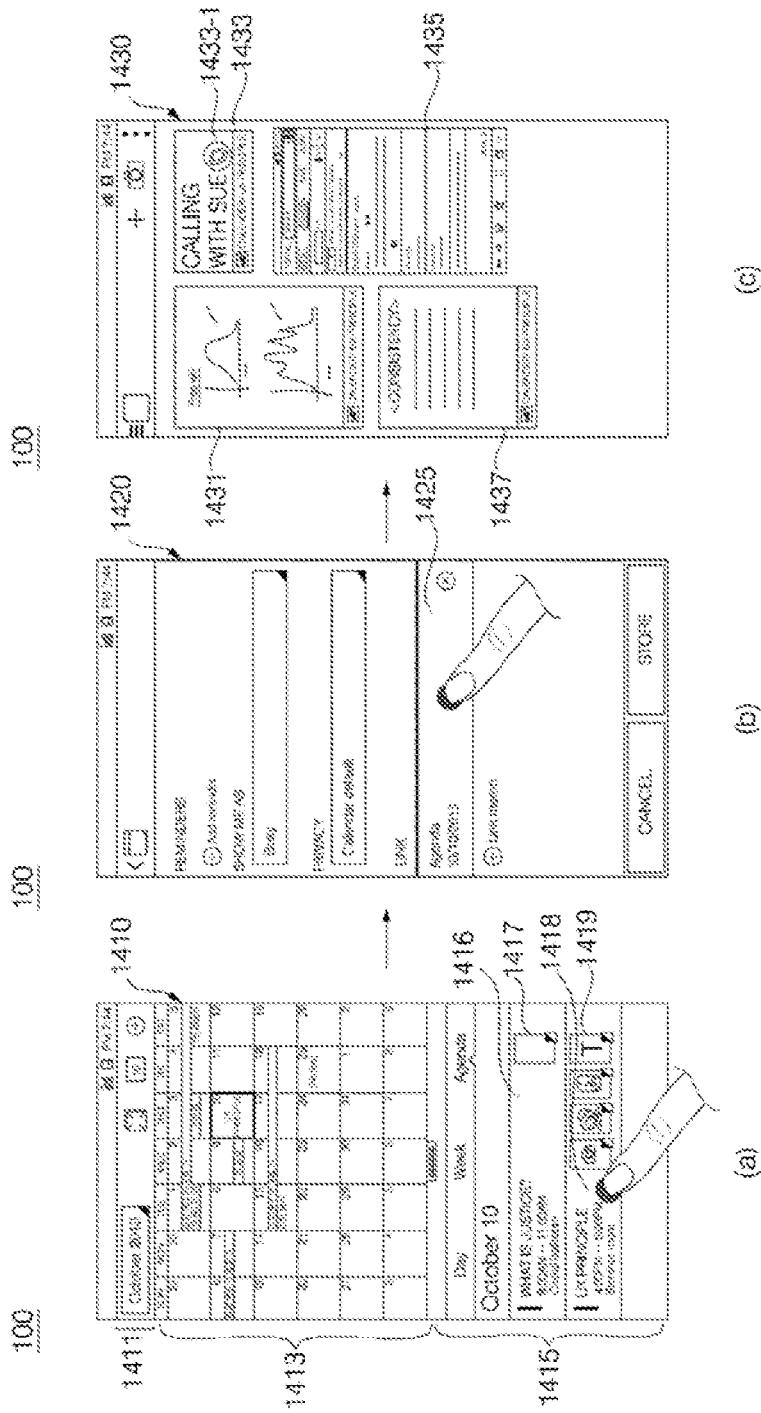
[FIG. 14]

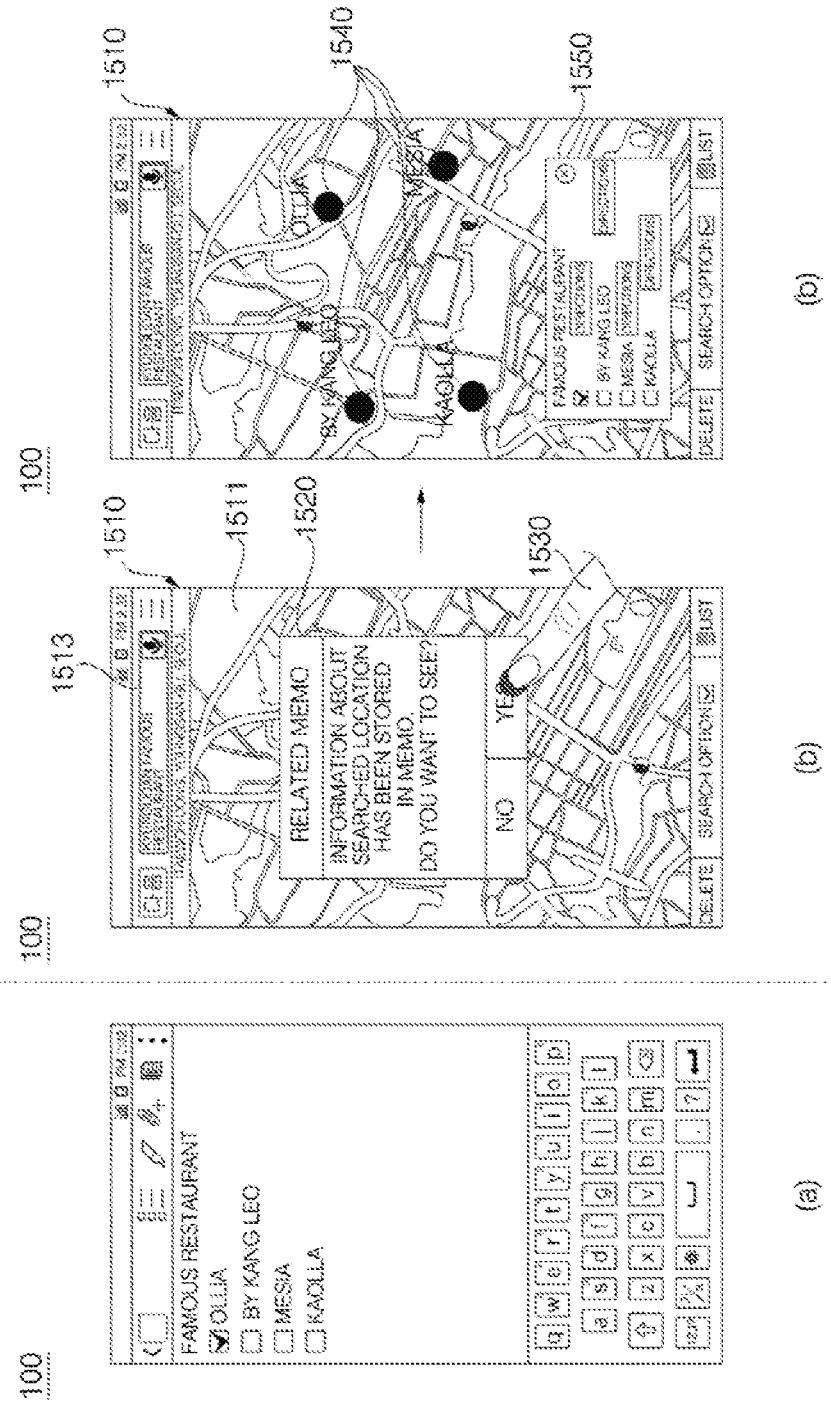

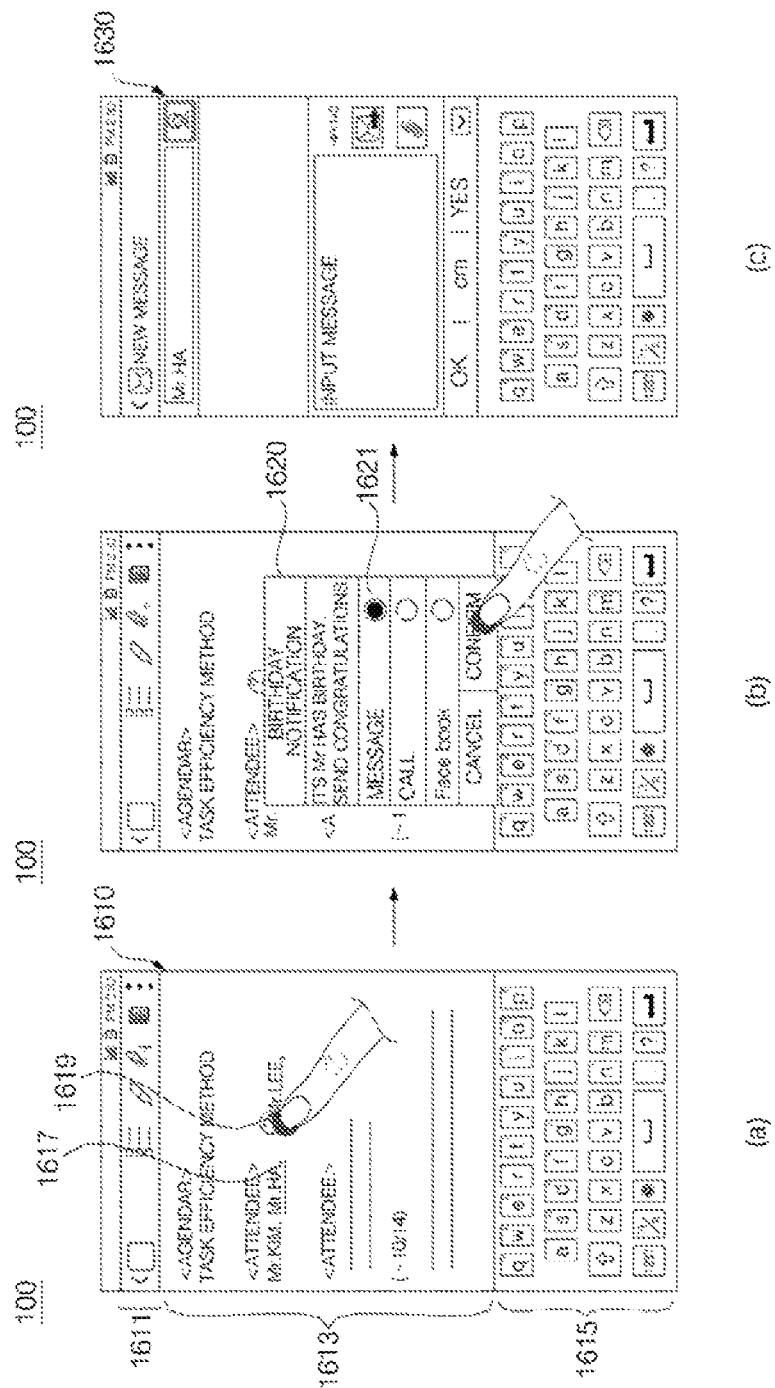

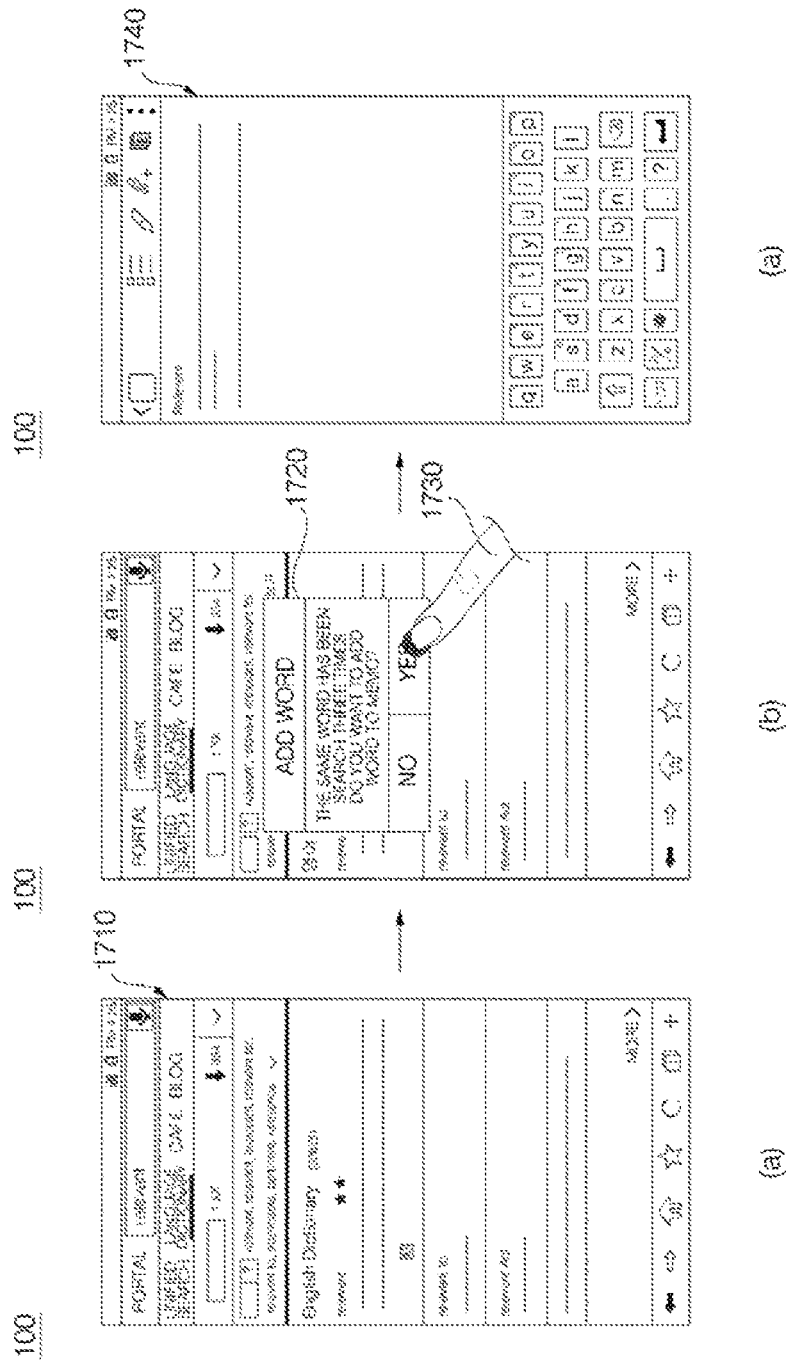
[FIG. 17]

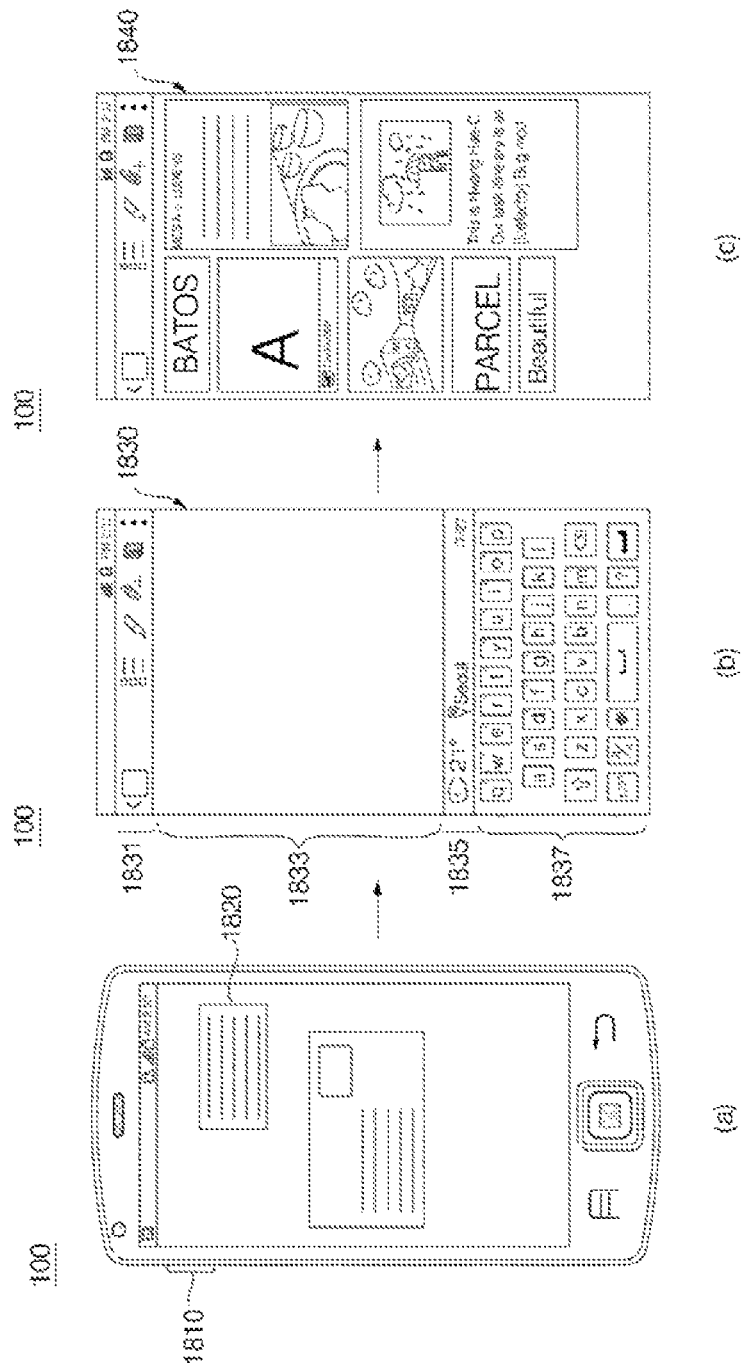
[FIG. 18]

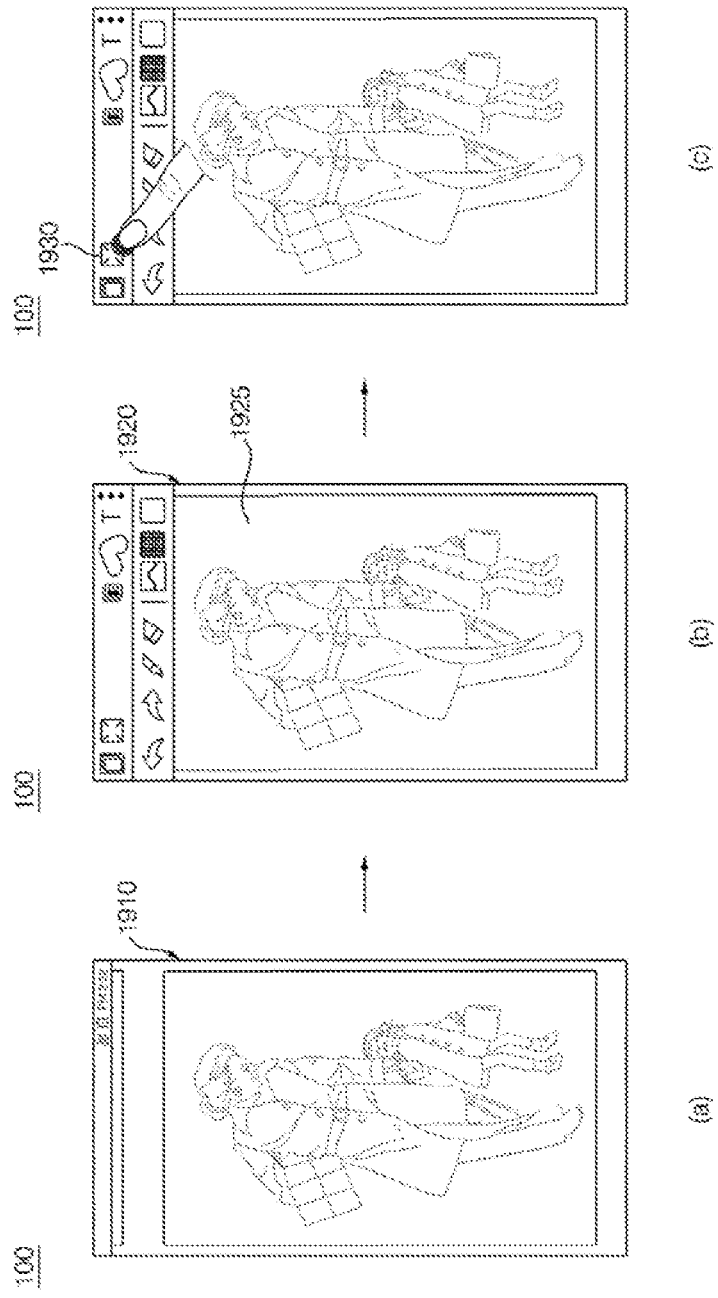

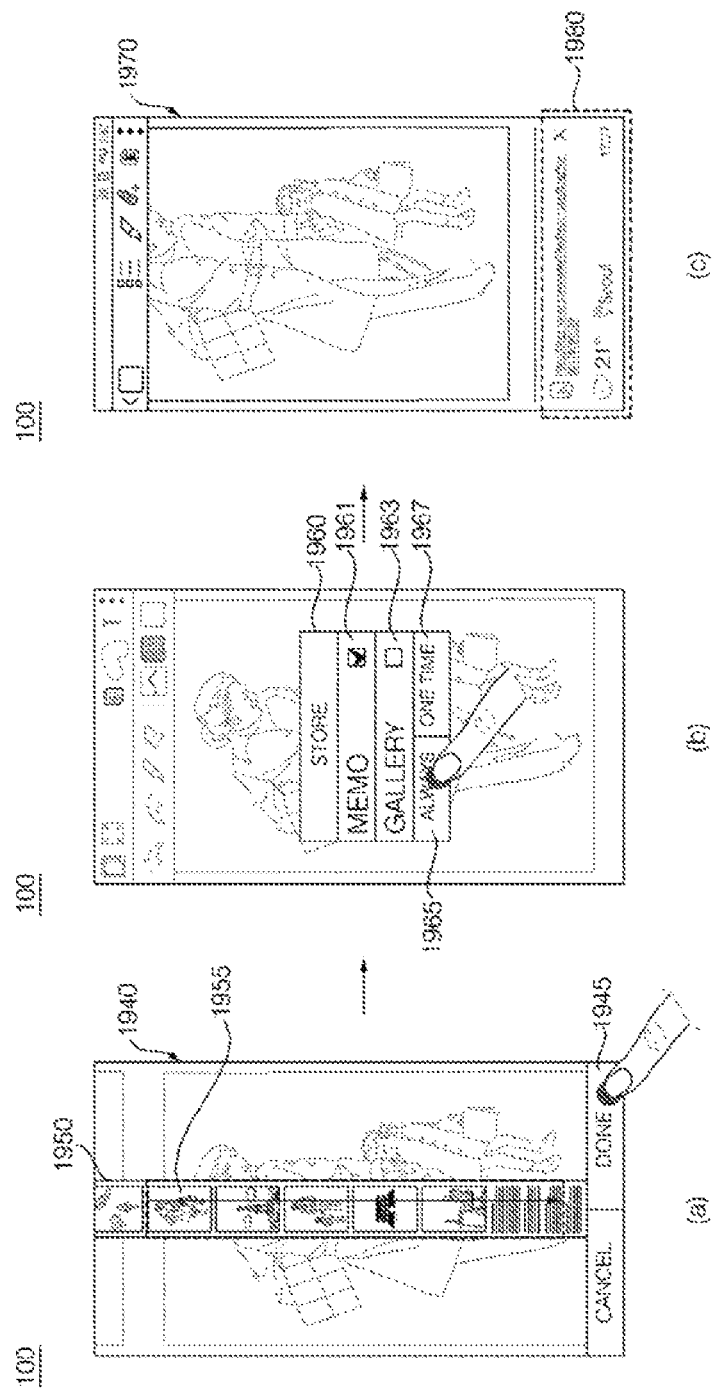
[FIG. 19B]

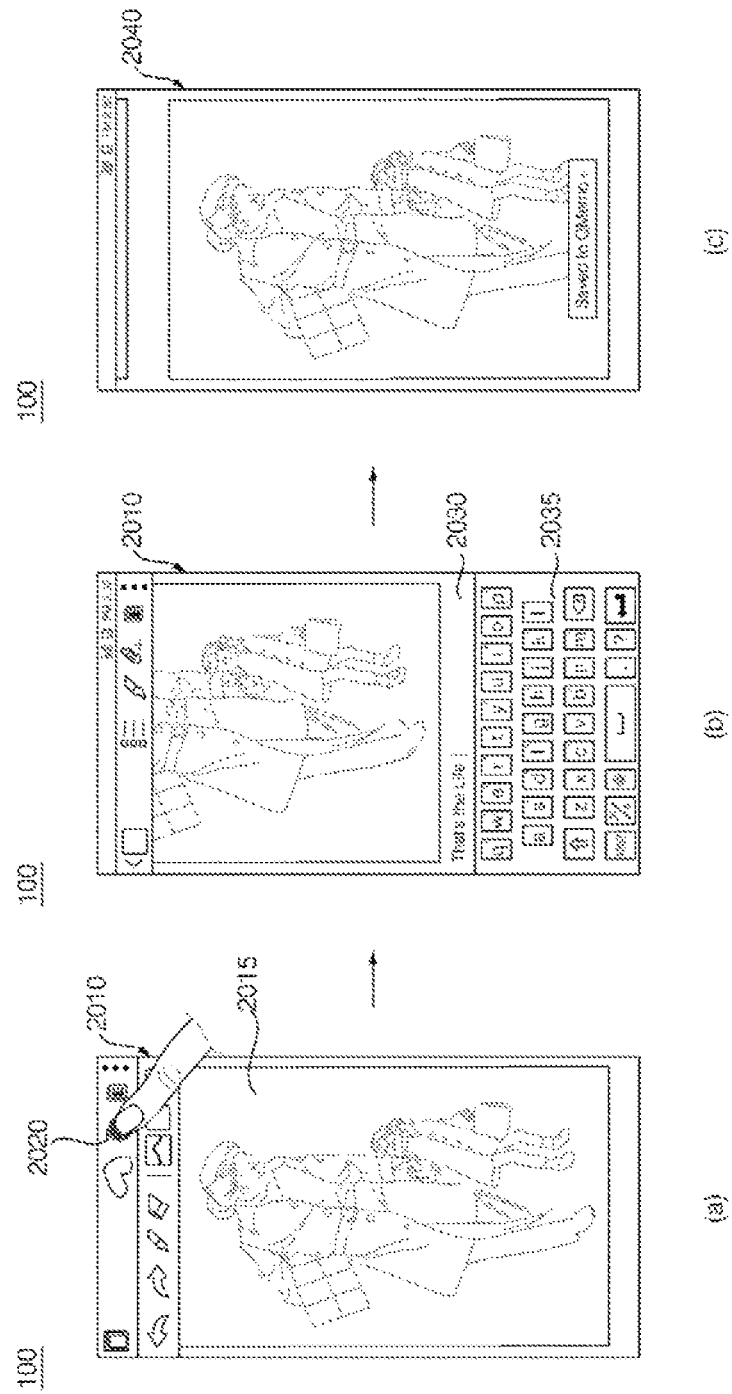
[FIG. 20]

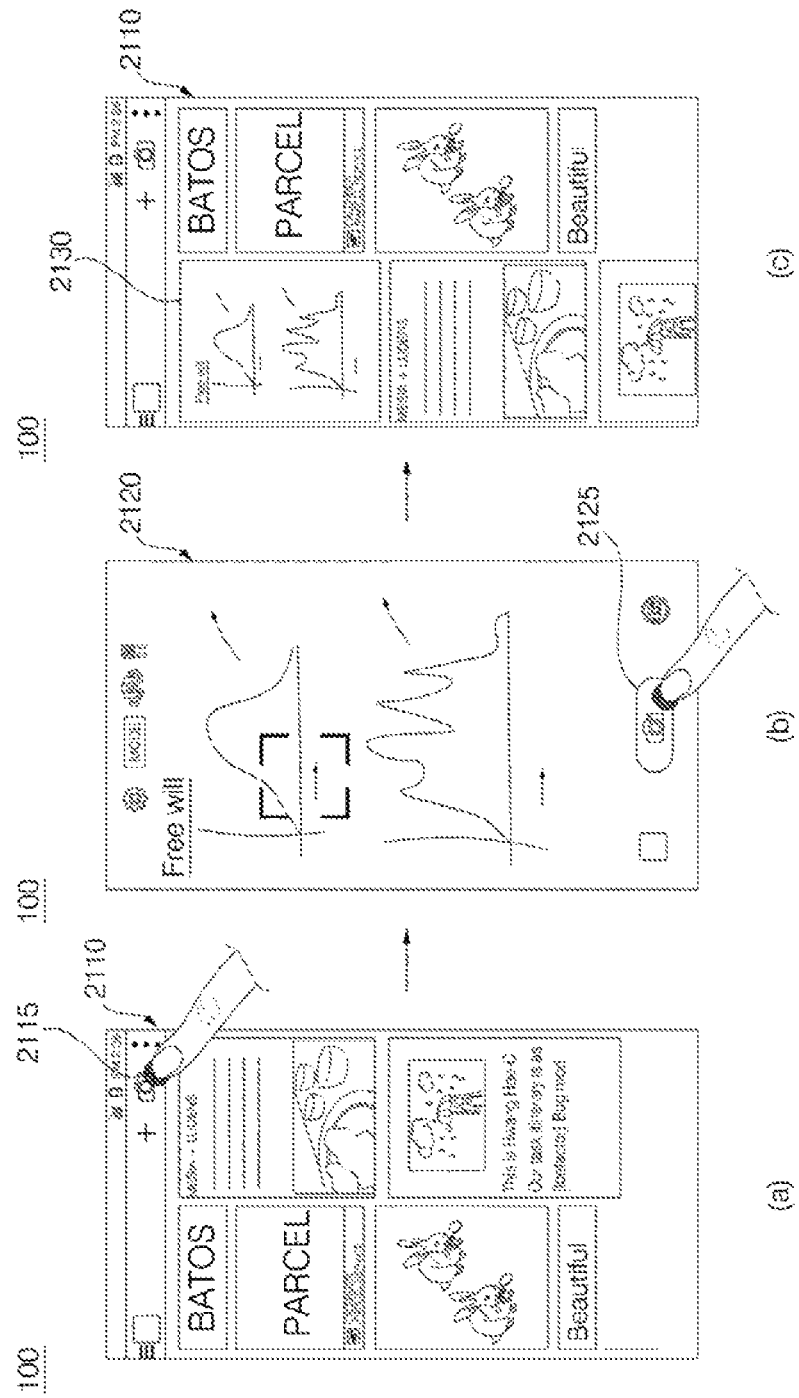
[FIG. 21]

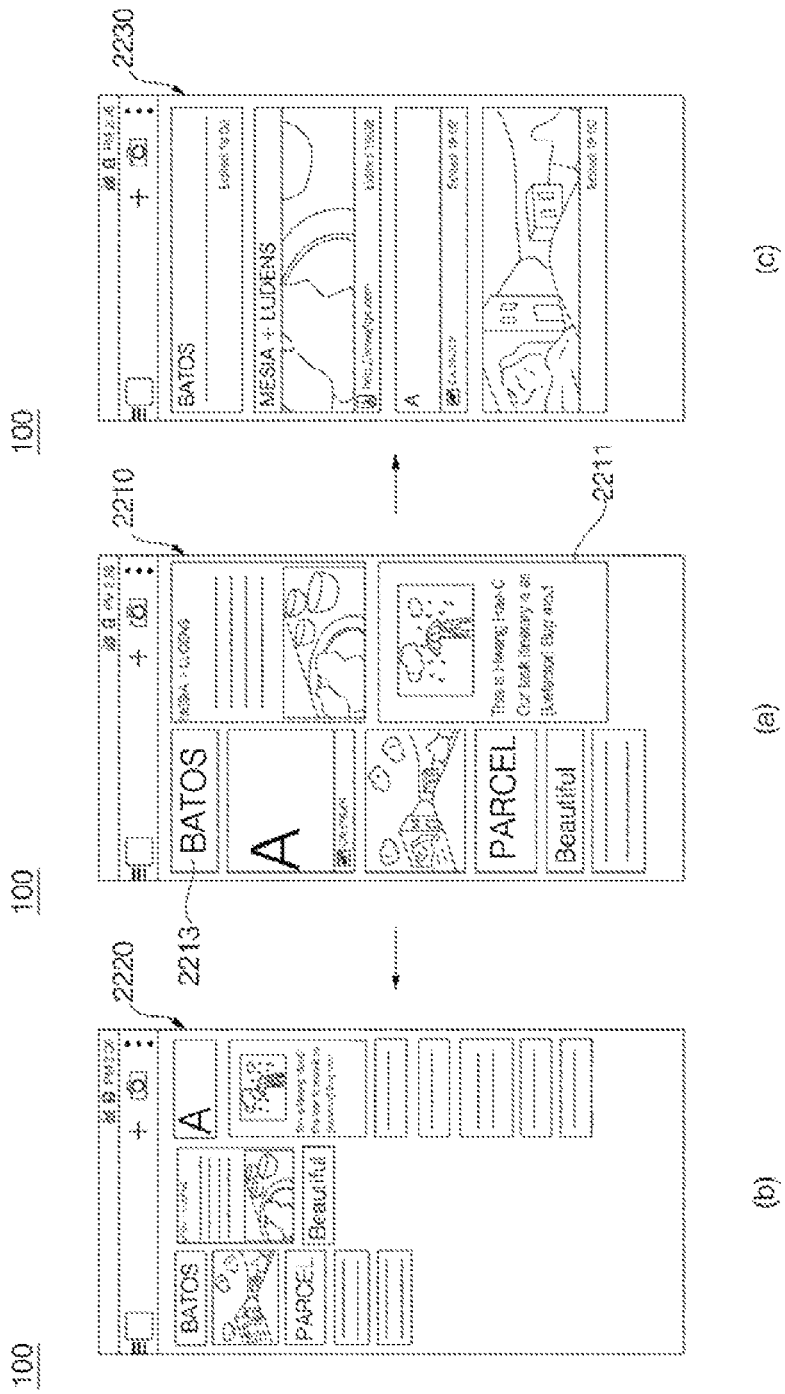

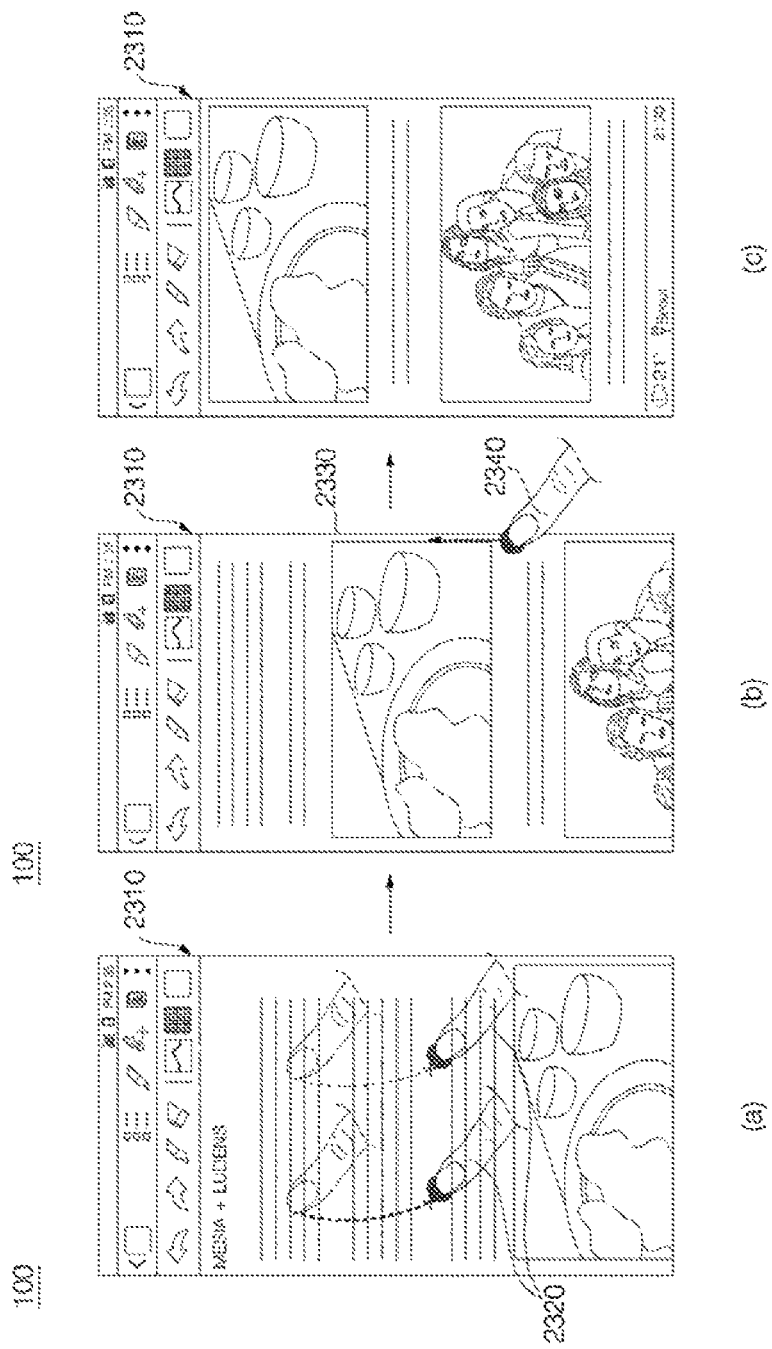
[FIG. 23]

[FIG. 24]
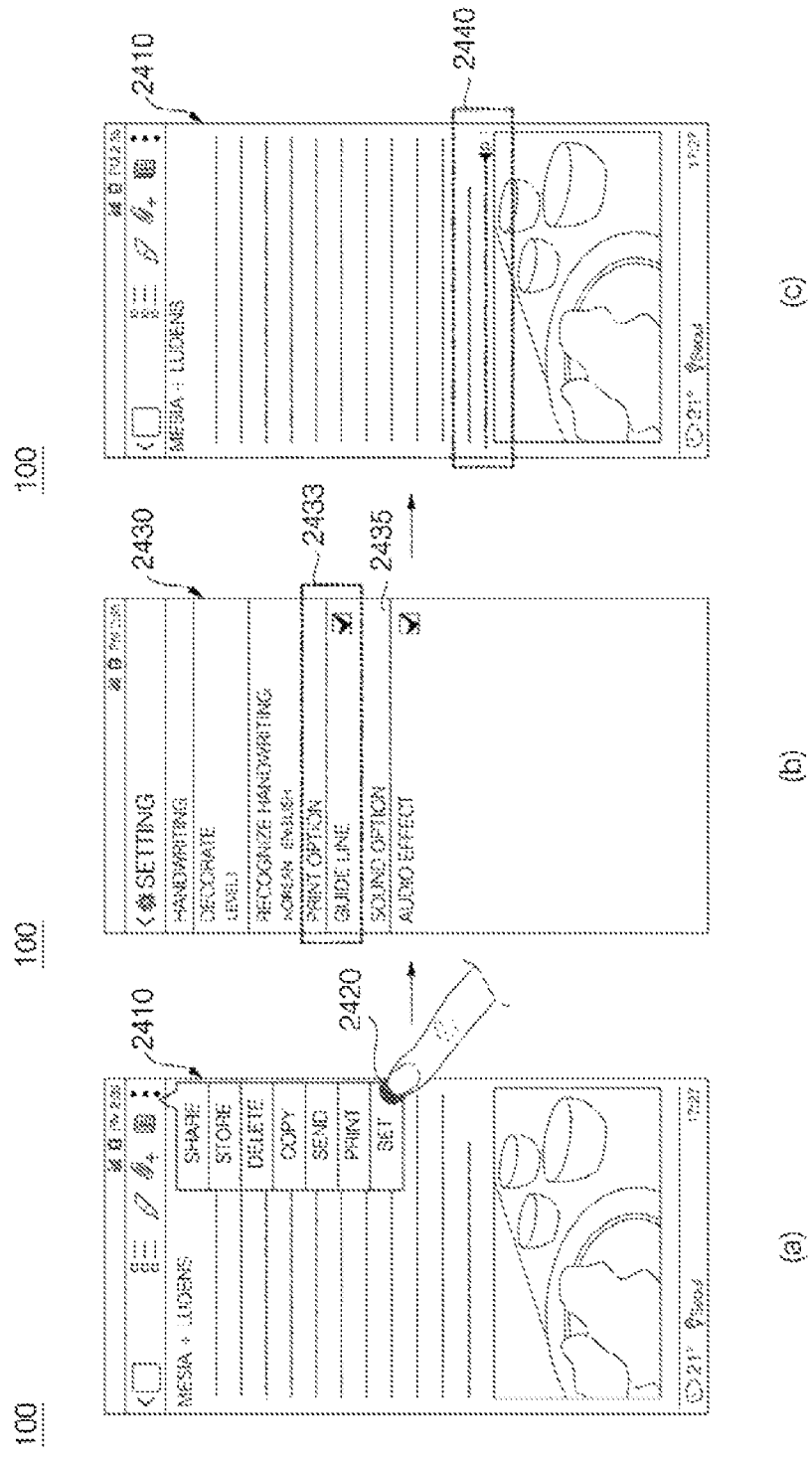

[FIG. 25]
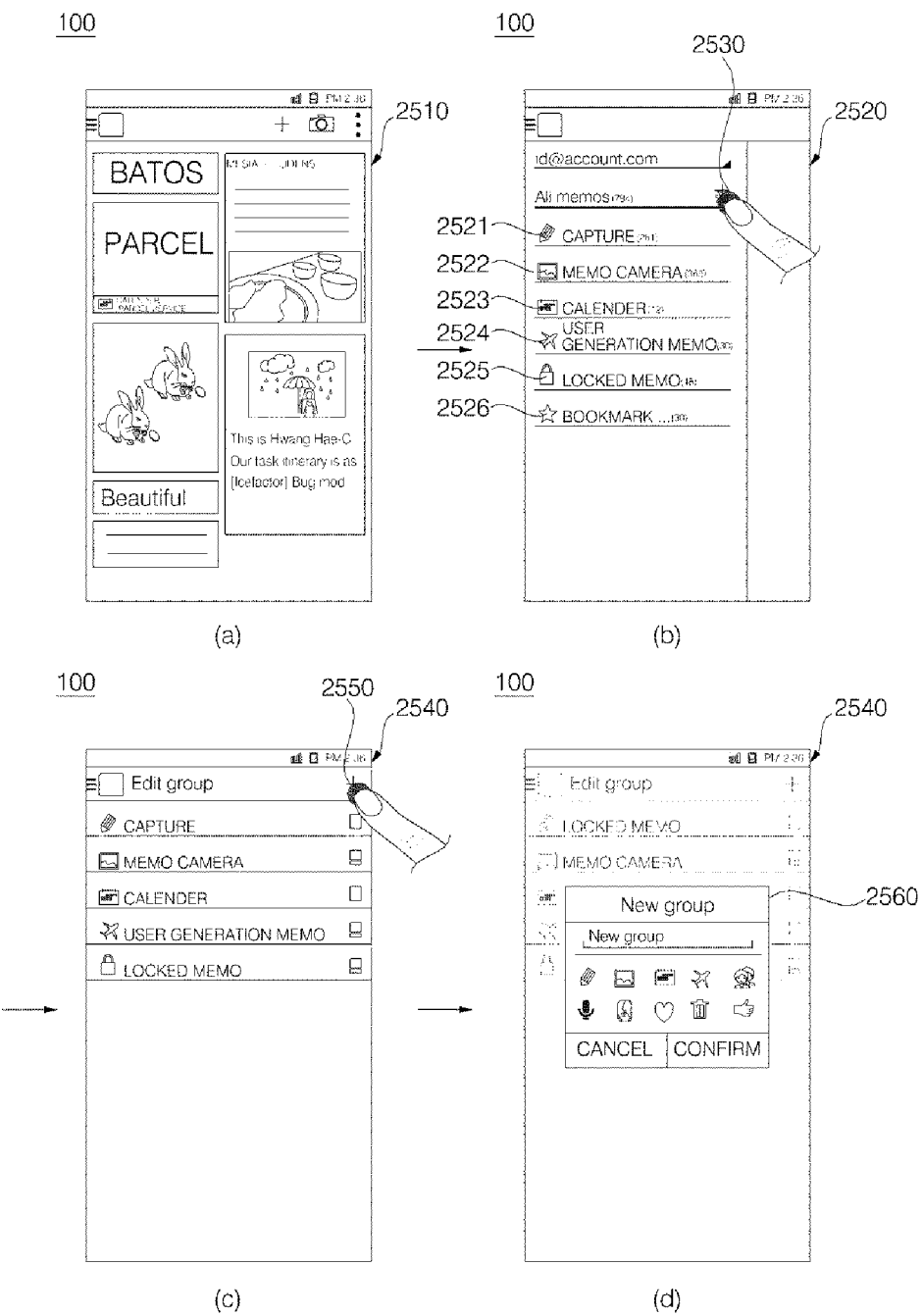

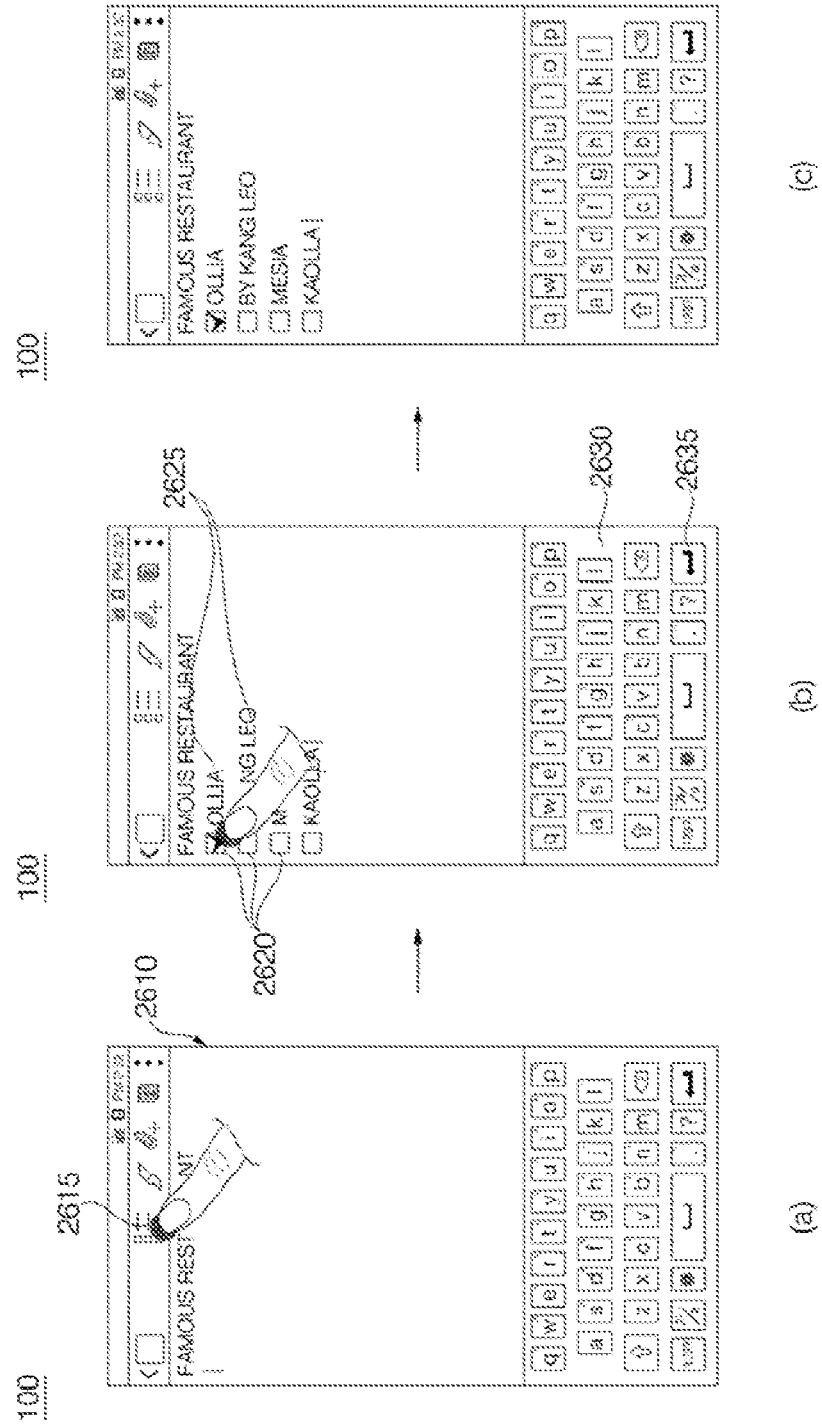

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2014/008341, filed on Sep. 4, 2014, which claims the benefit of earlier filing date and right of priority to Korean Application No. 10-2014-0003520, filed on Jan. 10, 2014, the contents of which are all hereby incorporated by reference herein in their entirety.

TECHNICAL FIELD

The present invention relates to a mobile terminal and a method for controlling the same and, more specifically, to a mobile terminal configured to automatically link user data between different applications and a method for controlling the same.

BACKGROUND ART

Terminals may be classified into mobile/portable terminals and stationary terminals according to their mobility. Mobile terminals may be classified into handheld terminals and vehicle mounted terminals according to whether or not a user can directly carry the terminal.

Mobile terminals have become increasingly more functional. Examples of such functions include data and voice communication, capturing images and video via a camera, recording audio, playing music files via a speaker system, and displaying images and video on a display. Some mobile terminals include additional functionality which supports game playing and multimedia players. More recently, mobile terminals have been configured to receive broadcast and multicast signals which permit viewing of content such as videos and television programs.

As the functionality of terminals is diversified, the terminals have been implemented in the form of a multimedia player having complex functions, such as photographing of images and video, playback of music and video files, gaming, and broadcast reception. To support and improve the functionality of terminals, improvement of structural parts and/or software parts of terminals can be considered.

Meanwhile, recent mobile terminals have provided various additional service functions, such as a schedule management function, a memo function, a dictionary function and a location search function, for user convenience. However, these additional service functions are independently executed in general. Accordingly, it is necessary to develop a user interface environment in which new and convenient functions can be provided through interworking of the additional services.

DISCLOSURE

Technical Problem

An object of the present invention is to solve the above problem and other problems. Another object of the present invention to provide a mobile terminal configured to automatically link user data on the basis of schedule information of a calendar and a method for controlling the same.

Another object of the present invention is to provide a mobile terminal for enabling interworking of additional service functions other than a calendar function and a memo function and a method for controlling the same.

Another object of the present invention is to provide a mobile terminal for providing an easier and more convenient memo function on the basis of a new user interface environment and a method for controlling the same.

Technical Solution

In accordance with an aspect of the present invention, the above and other objects can be accomplished by the provision of a mobile terminal, including: a display unit; and a controller configured to, when an event related to an operation of the terminal is detected, display an operating screen corresponding to the detected event on the display unit and, when a schedule corresponding to a time when the detected event is generated is stored in a calendar, to control information about the event to be automatically linked to the schedule.

In accordance with another aspect of the present invention, there is provided a method for controlling a mobile terminal, including: detecting an event related to an operation of the terminal; checking whether a schedule corresponding to a time when the detected event is generated is stored in a calendar; and linking information about the event to the schedule of the calendar when the schedule corresponding to the time when the detected event is generated is stored in the calendar.

Advantageous Effects

Advantageous effects of the mobile terminal and the method for controlling the same according to the present invention will now be described.

According to at least one embodiment of the present invention, it is possible to enable a user to efficiently manage information about all events generated for a predetermined time on a calendar by automatically linking user data on the basis of schedule information of the calendar.

In addition, according to at least one embodiment of the present invention, it is possible to provide improved user convenience over conventional mobile terminals by interworking a memo function and other additional service functions.

Furthermore, according to at least one embodiment of the present invention, it is possible to enable the user to easily create memos and easily view created memos by providing a memo application including a new user interface.

Other effects will be directly or suggestively described in the following detailed description according to embodiments of the present invention.

DESCRIPTION OF DRAWINGS

FIG. 1 is a block diagram of a mobile terminal according to the present invention.

FIG. 2 is a front perspective view of a mobile terminal according to an embodiment of the present invention.

FIG. 3 is a rear perspective view of the mobile terminal according to an embodiment of the present invention.

FIG. 4 is a flowchart illustrating operation of the mobile terminal to link a memo function and a calendar function according to a first embodiment of the present invention.

FIGS. 5 and 6 illustrate operation of the mobile terminal to automatically link a memo to a calendar.

FIG. 7 illustrates operation of the mobile terminal to display information about a memo linked to a corresponding schedule in a calendar mode.

FIG. 8 illustrates operation of the mobile terminal to arrange and display schedules linked to a memo in the calendar mode.

FIG. 9 illustrates operation of the mobile terminal to display a memo list screen including memo items linked to the calendar in a memo mode.

FIG. 10 is a flowchart illustrating operation of the mobile terminal to automatically link information about all events generated at times corresponding to schedules on the calendar according to a second embodiment of the present invention.

FIG. 11 illustrates operation of the mobile terminal to set an automatic link mode on a calendar screen.

FIGS. 12 and 13 illustrate operation of the mobile terminal to automatically link information about all events generated at times corresponding to schedules on the calendar.

FIG. 14 illustrates operation of the mobile terminal to provide information about all events linked to a corresponding schedule in the calendar mode.

FIG. 15 illustrates operation of the mobile terminal to link a location search function to the memo function.

FIG. 16 illustrates operation of the mobile terminal to link the memo function to an address book function.

FIG. 17 illustrates a configuration of a memo application according to an embodiment of the present invention.

FIG. 18 illustrates the configuration of the memo application according to an embodiment of the present invention.

FIGS. 19A, 19B, and 20 illustrate operation of the mobile terminal to capture content of a webpage and to insert the captured content into a memo during web surfing.

FIG. 21 illustrates operation of the mobile terminal to switch from the memo mode to a camera mode.

FIG. 22 illustrates operation of the mobile terminal to provide a memo list screen on which the size of a preview image is dynamically changed according to the quantity of content stored in a memo item.

FIG. 23 illustrates operation of the mobile terminal to scroll a memo creation screen according to predetermined user input.

FIG. 24 illustrates operation of the mobile terminal to provide a guideline for a page to be output to a printer in a memo creation mode.

FIG. 25 illustrates operation of the mobile terminal to align items stored in memos by groups using Meta information.

FIG. 26 illustrates operation of the mobile terminal to provide a to-do list item in the memo creation mode.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Examples of a mobile terminal described in the specification include cellular phones, smart phones, laptop computers, digital broadcast terminals, personal digital assistants (PDAs), portable multimedia players (PMPs), navigation systems, slate PCs, tablet PCs, ultrabooks, wearable devices (for example, smart watches, smart glasses, head mounted displays (HMDs)), and the like.

However, it will be apparent to those skilled in the art that embodiments described in the specification can be applied to stationary terminals such as digital TV, desktop computers and digital signage, except a case in which the embodiments are applicable to mobile terminal only.

Referring to FIGS. 1, 2 and 3, FIG. 1 is a block diagram of a mobile terminal in accordance with the present invention and FIGS. 2 and 3 are perspective views of the mobile terminal in accordance with the present invention, viewed from different directions.

The mobile terminal 100 may include a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

More specifically, the wireless communication unit 110 may include one or more modules which permit wireless communication between the mobile terminal 100 and a wireless communication system, between the mobile terminal 100 and another mobile terminal 100 or between the mobile terminal 100 and an external server. Further, the wireless communication unit 110 may include one or more modules which connect the mobile terminal 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or a video input unit for inputting a video signal, a microphone 122 or an audio signal input unit for inputting an audio signal, and a user input unit 123 (for example, a touch key, a push key, and the like) for receiving information from a user. Audio data or image data obtained by the input unit 120 may be analyzed and processed by a control command of the user.

The sensing unit 140 may include one or more sensors configured to sense internal information of the mobile terminal, the surrounding environment of the mobile terminal and user information. For example, the sensing unit 140 can include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), the microphone 122, a battery gauge, an environment sensor (for example, a barometer, a hygrometer, a thermometer, a radiation detection sensor, a thermal sensor, a gas sensor, and the like), and a chemical sensor (for example, an electronic nose, a health care sensor, a biometric sensor, and the like). The mobile terminal 100 may be configured to utilize information obtained from one or more sensors of the sensing unit 140, and combinations thereof.

The output unit 150 is typically configured to output various types of information, such as audio, video, tactile output, and the like and may include at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. The mobile terminal 100 may perform control functions associated with a connected external device, in response to the external device being connected to the interface unit 160.

The memory 170 is typically implemented to store data to support various functions or features of the mobile terminal 100. The memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs can be stored in the memory 170, installed in the mobile terminal 100, and executed by the controller 180 to perform an operation (or function) for the mobile terminal 100.

The controller 180 functions to control overall operation of the mobile terminal 100, in addition to the operations associated with the application programs. The controller 180 may provide or process information or functions appropriate for a user by processing signals, data, information and the like, which are input or output by the aforementioned components, or executing application programs stored in the memory 170.

The controller 180 may control some or all of the components illustrated in FIG. 1 in order to execute an application program stored in the memory 170. Furthermore, the controller 180 may operate at two or more of the components included in the mobile terminal 100 in combination to execute the application program.

The power supply unit 190 is configured to receive external power or provide internal power in order to supply appropriate power required for operating elements and components included in the mobile terminal 100 under the control of the controller 180. The power supply unit 190 may include a battery, and the battery may be configured to be embedded in the terminal body, or configured to be detachable from the terminal body.

At least some of the aforementioned components may cooperatively operate to implement operations, control or control method of the mobile terminal according to embodiments which will be described below. The operations, control or control method of the mobile terminal may be implemented in the mobile terminal according to execution of one or more application programs stored in the memory 170.

Prior to description of various embodiments implemented through the aforementioned mobile terminal 100, the above-described components will now be described in more detail with reference to FIG. 1.

Regarding the wireless communication unit 110, the broadcast receiving module 111 of the wireless communication unit 110 is configured to receive a broadcast signal and/or broadcast associated information from an external broadcast management server via a broadcast channel. The broadcast channel may include a satellite channel and a terrestrial channel. Two or more broadcast receiving modules 111 may be provided to the mobile terminal 100 to facilitate simultaneously receiving of two or more broadcast channels, or to support switching among broadcast channels.

The mobile communication module 112 transmits and receives wireless signals to and from at least one of a base station, an external terminal and a server over a mobile communication network, which is constructed according to technical standards or communication methods for mobile communications (for example, Global System for Mobile Communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), Long Term Evolution-Advanced (LTE-A), and the like).

Examples of wireless signals may include audio call signals, video telephony call signals, or various formats of data to support communication of text and multimedia messages.

The wireless Internet module 113 is configured to facilitate wireless Internet access and may be internally or externally coupled to the mobile terminal 100. The wireless Internet module 113 may transmit and receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-A (Long Term Evolution-Advanced), and the like. The wireless Internet module 113 may transmit/receive data according to one or more of such wireless Internet technologies, and other Internet technologies as well.

When wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 can support wireless communications between the mobile terminal 100 and a wireless communication system, communications between the mobile terminal 100 and another mobile terminal 100, or communications between the mobile terminal 100 and a network where another mobile terminal 100 (or an external server) is located, via wireless area networks. One example of the wireless area networks is a wireless personal area networks.

In some embodiments, another mobile terminal 100 may be a wearable device (for example, a smart watch, a smart glass or a head mounted display (HMD)) which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect a position (or current position) of the mobile terminal. As an example, the location information module 115 includes a Global Position System (GPS) module or a Wi-Fi module. As one example, when the mobile terminal uses the GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally execute the function of any of the other modules of the wireless communication unit 110 to obtain data related to the position of the mobile terminal. The location information module 115 is a module used to obtain the position (current position) of the mobile terminal and is not limited to modules which directly calculate or obtain the position of the mobile terminal.

The input unit 120 may be configured to permit various types of input to the mobile terminal 120. Examples of such input include audio, image, video, data, and user input. The mobile terminal 100 may include one or more cameras 121 for video information input. Such cameras 121 may process image frames of still pictures or video obtained by image sensors in a video call mode or an image capture mode. The processed image frames can be displayed on the display unit 151 or stored in memory 170. In some cases, the cameras 121 included in the mobile terminal 100 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to process an external audio signal into electrical audio data. The processed audio data can be utilized in various manners according to a function (or application program) being executed in the mobile terminal 100. If desired, the microphone 122 may include assorted noise removing algorithms to remove unwanted noise generated in the course of receiving the external audio signal.

The user input unit 123 is a component that permits input of information by a user. Such user input may enable the controller 180 to control operation of the mobile terminal 100. The user input unit 123 may include a mechanical input means (or a mechanical key, for example, a button located on a front and/or rear surface or a side surface of the mobile terminal 100, a dome switch, a jog wheel, a jog switch, and the like) and a touch-sensitive input means. As one example, the touch-sensitive input may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal and user information and to generate a sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of an object with conductivity by changes of an electromagnetic field, which is responsive to an approach of the object with conductivity. In this case, the touch screen (or touch sensor) may also be categorized as a proximity sensor.

The term "proximity touch" will often be referred to herein to denote the scenario in which an object is positioned to be proximate to the touch screen without contacting the touch screen. The term "contact touch" will often be referred to herein to denote the scenario in which an object makes physical contact with the touch screen. For the position corresponding to the proximity touch of the object relative to the touch screen, such position will correspond to a position where the object is perpendicular to the touch screen. The proximity sensor 141 may sense proximity touch, and proximity touch patterns (for example, proximity touch distance, proximity touch direction, proximity touch speed, proximity touch time, proximity touch position, proximity touch moving status, and the like). The controller 180 processes data corresponding to proximity touches and proximity touch patterns sensed by the proximity sensor 141, and cause output of visual information corresponding to the processed data on the touch screen. In addition, the controller 180 can control the mobile terminal 100 to execute different operations or process different data according to whether a touch with respect to a point on the touch screen is either a proximity touch or a contact touch.

A touch sensor senses a touch (or touch input) applied to the touch screen (or display unit 151) using at least one of a variety of touch methods. Examples of such touch methods include a resistive type, a capacitive type, an infrared type, an ultrasonic type and a magnetic field type.

As one example, the touch sensor may be configured to convert changes of pressure applied to a specific part of the display unit 151, or convert capacitance occurring at a specific part of the display unit 151, into electrical input signals. The touch sensor may also be configured to sense a touched position, a touched area, touch pressure and touch capacitance. A touch object is generally used to apply a touch input to the touch sensor. Examples of typical touch objects include a finger, a touch pen, a stylus pen, a pointer, and the like.

When a touch input is sensed by the touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180.

In some embodiments, the controller 180 may execute the same or different controls according to a type of touch object that touches the touch screen (or a touch key provided in addition to the touch screen). Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

An ultrasonic sensor may be implemented to recognize position information relating to a touch object using ultrasonic waves. The controller 180, for example, may calculate a position of a wave generation source based on information sensed by an optical sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. More specifically, the position of the wave generation source may be calculated using the time difference from the time that the ultrasonic wave reaches the sensor based on the light as a reference signal.

The camera 121 included in the input unit 120 includes at least one a camera sensor (e.g., CCD, CMOS and the like), a photo sensor (or image sensor), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to display (output) information processed in the mobile terminal 100. For example, the display unit 151 may display execution screen information of an application program executed in the mobile terminal 100 or user interface (UI) and graphic user interface (GUI) information in response to the execution screen information.

In addition, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be received from the wireless communication unit 110 or may have been stored in the memory 170. The audio data may be output in a call signal reception mode, a call mode, a record mode, a voice recognition mode, a broadcast reception mode, and the like. The audio output module 152 may output audio signals related to functions (e.g., a call signal reception sound, a message reception sound, etc.) executed by the mobile terminal 100. The audio output module 152 may include a receiver, a speaker, a buzzer, and the like.

A haptic module 153 is configured to generate various tactile effects that a user feels, perceive, or otherwise experience. A typical example of a tactile effect generated by the haptic module 153 is vibration. The strength and pattern of vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 outputs a signal for indicating an event generation using light of a light source. Examples of events generated in the mobile terminal 100 may include message reception, call signal reception, a missed call, an alarm, a schedule notice, an email reception, information reception through an application, and the like.

A signal output from the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. The interface unit 160 receives data transmitted from an external device, receive power to transfer to elements and components within the mobile terminal 100, or transmit internal data of the mobile terminal 100 to such external device. For example, the interface unit 160 may include wired or wireless headset ports, external charger ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. The device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and temporarily store input/output data (for example, phonebook, messages, still images, videos, etc.). The memory 170 may store data related to various patterns of vibrations and sound which are output in response to touch inputs on the touch screen.

The memory 170 may include one or more types of storage mediums including a flash memory, a hard disk, a solid state disk, a silicon disk drive (SSD), a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a web storage that performs the storage function of the memory 170 over the Internet.

As described above, the controller 180 may typically control application program related operations and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, or similar medium using, for example, software, hardware, or any combination thereof.

Referring to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

The terminal body can be understood to refer to the mobile terminal 100 when the mobile terminal is regarded as at least one assembly.

The mobile terminal 100 generally includes a case (for example, frame, housing, cover, and the like) forming the appearance of the terminal. The mobile terminal 100 may include a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, first and second audio output modules 152a and 152b, the proximity sensor 141, the illumination sensor 142, the optical output module 154, first and second cameras 121a and 121b, first and second manipulation units 123a and 123b, the microphone 122 and the interface unit 160.

A description will be given of the mobile terminal 100 configured in such a manner that the display unit 151, the first audio output module 152a, the proximity sensor 141, the illumination sensor 142, the optical output unit 154, the first camera 121a and the first manipulation unit 123a are provided to the front surface of the terminal body, the second manipulation unit 123b, the microphone 122 and the interface unit 160 are provided to the side of the terminal body, and the second audio output module 152b and the second camera 121b are provided to the rear surface of the terminal body, as shown in FIGS. 2 and 3.

However, it is to be understood that alternative arrangements are possible. Some components may be omitted or rearranged. For example, the first manipulation unit 123a may not be located on the front surface of the terminal body, and the second audio output module 152b may be located on the side surface of the terminal body.

The display unit 151 displays (outputs) information processed in the mobile terminal 100. For example, the display unit 151 can display information on execution screens of application programs executed in the mobile terminal 100 or UI (User Interface) and GUI (Graphic User Interface) information according to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices according to type of the mobile terminal 100. In this case, a plurality of the display units may be arranged on one side, either spaced apart from each other, or these devices may be integrated, or these devices may be arranged on different surfaces.

The display unit 151 may also include a touch sensor which senses a touch input applied to the display unit 151 to receive a control command according to a touch method. When a touch is applied to the display unit 151, the touch sensor may be configured to sense the touch and the controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display (not shown) on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1). The touch screen may replace at least some of the functions of the first manipulation unit 123a.

The first audio output module 152a may be implemented in the form of a receiver to output sounds to the ear of a user, and the second audio output module 152b may be implemented in the form of a loud speaker to output alarm sounds, multimedia audio reproduction, and the like.

The window 151a of the display unit 151 may include an aperture to permit audio generated by the first audio output module 152a to pass. However, the present invention is not limited thereto and one alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance of the mobile terminal 100.

The optical output module 154 is configured to output light for indicating an event generation. Examples of such events include a message reception, a call signal reception, a missed call, an alarm, a schedule notice, an email reception, information reception through an application, and the like. When a user has checked a generated event, the controller 180 can control the optical output unit 154 to stop output of light.

The first camera 121a processes image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to receive commands for controlling operations of the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a push key, or combinations of the push key and a touch key.

Input received through the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to receive commands for controlling operations of the mobile terminal 100. The input may be used in a variety of different ways. For example, the rear input unit may be used by the user to provide an input for power on/off, start, end, scroll, control volume level being output from the first or second audio output modules 152a or 152b, switch to the touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate the rear input unit using a forefinger when the user grabs the terminal body with one hand. However, the present invention is not limited thereto and the position of the rear input unit may be changed.

When the rear input unit is provided to the rear side of the terminal body, a new user interface using the rear input unit may be implemented. Further, when the aforementioned touch screen or the rear input unit implements some or all of the functionality of the first manipulation unit 123a provided to the front side of the terminal body and thus the first manipulation unit 123 is omitted from the front side of the terminal body, the display unit 151 can have a larger screen.

As a further alternative, the mobile terminal 100 may include a finger scan sensor which scans a user's fingerprint. The controller 180 can then use fingerprint information sensed by the finger scan sensor as an authentication means. The finger scan sensor may be installed in the display unit 151 or implemented in the user input unit 123.

The microphone 122 is configured to receive voice of a user, guitar sound and the like. The microphone 122 may be provided to a plurality of locations and configured to receive stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and has an image capturing direction that is substantially opposite to the image capturing direction of the first camera unit 121a.

The second camera 121b can include a plurality of lenses arranged along at least one line. The plurality of lenses may be arranged in a matrix configuration. Such camera may be referred to as an "array camera." When the second camera 121b is implemented as an array camera, images may be captured in various manners using the plurality of lenses and images with better qualities may be obtained.

A flash 124 is shown adjacent to the second camera 121b. When an image of a subject is captured with the camera 121b, the flash 124 may illuminate the subject.

The second audio output module 152b may be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed on the case. For example, an antenna which configures a part of the broadcast receiving module 111 (see FIG. 1) may be retractable into the terminal body. Alternatively, an antenna may be formed using a film attached to an inner surface of the rear cover 103, or a case that includes a conductive material.

The terminal body may include a power supply unit 190 (see FIG. 1) for supplying power to the mobile terminal 100. The power supply unit 190 may include a battery 191, which is mounted in the terminal body or detachably coupled to the outside of the terminal body.

The battery 191 may receive power via a power cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting the appearance or assisting or extending the functions of the mobile terminal 100 can also be provided to the mobile terminal 100. As one example of such accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending touch input to the touch screen.

The configuration of the mobile terminal according to the present invention has been described with reference to FIGS. 1, 2 and 3. A description will be given of a mobile terminal configured to automatically link user data on the basis of schedule information of the calendar and a method for controlling operations of the mobile terminal according to various embodiments of the present invention.

FIG. 4 is a flowchart illustrating operation of the mobile terminal to link a memo function and a calendar function.

Referring to FIG. 4, the controller 180 controls the mobile terminal to enter a memo creation mode by executing a memo application according to a user command or the like (S410). Accordingly, the controller 180 displays a memo creation screen including a memo display window and a character input window on the display unit 151.

Upon reception of user input through the character input window while the memo creation screen is displayed, the controller 180 displays text generated through the user input on the memo display window (S420).

When a menu item "store" is selected after completion of generation of the text, the controller 180 detects the memo creation time and then checks whether a schedule on the calendar, which corresponds to the memo creation time, is present (S440). That is, the controller 180 checks whether schedules on the calendar include a schedule coincident with the memo creation time.

The memo creation time may be a time at which the memo creation screen is initially displayed, a time at which initial memo input is received, a time at which last memo input is received, a time at which the menu item "store" is selected by the user, a time between the initial memo input time and the last memo input time, or the like. However, the memo creation time is not limited thereto.

When the schedule on the calendar, which corresponds to the memo creation time, is not present, the controller 180 stores the created text and finishes the procedure according to the present invention in step S480.

When a schedule on the calendar corresponds to the memo creation time, the controller 180 displays a pop-up window for asking the user about connection (linkage) of the generated text to the corresponding schedule, on the display unit 151 (S450).

Upon reception of a linkage request command of the user through the pop-up window (S460), the controller 180 links the generated text to the corresponding schedule on the calendar and then stores the text in a predetermined memory space (S470 and S480). Accordingly, the user of the mobile terminal 100 can check memo information linked to the corresponding schedule in the calendar mode.

When the linkage request command of the user is not received through the pop-up window (S460), the controller 180 stores the generated text and then ends the procedure according to the present invention in step S480.

FIGS. 5 to 9 illustrate operations of the mobile terminal according to a first embodiment of the present invention.

FIGS. 5 and 6 illustrate operation of the mobile terminal to automatically link a memo to a calendar.

Referring to FIG. 5, the mobile terminal 100 enters the memo creation mode by executing the memo application according to a user command or the like. Accordingly, the mobile terminal 100 displays the memo creation screen 510 including a menu bar 511 on which menu items related to the memo function are arranged, a memo display window 513 and a character input window 515, on the display unit 151.

When user input is received through the character input window 515 while the memo creation screen 510 is displayed, the mobile terminal 100 displays a text generated through the user input on the memo display window 513.

When a menu item "store" 520 is selected after completion of generation of the text, the mobile terminal 100 detects a memo creation time and checks whether a schedule on the calendar, which corresponds to the memo creation time, is present.

Here, it is assumed that the memo creation time detected by the mobile terminal 100 is 2:32 pm Oct. 10, 2013. In addition, it is assumed that a schedule "Task efficiencies" is preset from 2 PM to 3 PM Oct. 10, 2013 according to a user command, as shown in FIG. 5(c).

Referring to FIG. 6, when the schedule on the calendar, which corresponds to the memo creation time is present as assumed, the mobile terminal 100 displays a pop-up window 530 for asking the user whether to link the generated text to the corresponding schedule, in a region of the memo creation screen 510.

When a linkage request command of the user is received through the pop-up window 530, the mobile terminal 100 links the generated text to the corresponding schedule on the calendar and then stores the text in a predetermined memory space. Then, the mobile terminal 100 displays a memo list screen 540 including stored memo items on the display unit 151, as shown in FIG. 6(b). Here, the memo list screen 540 can provide preview images of the content of the stored memo items. Accordingly, the user of the mobile terminal can preview the content of all created memos without selecting an item of the memo list.

FIG. 7 illustrates operation of the mobile terminal to display information about a memo linked to the corresponding schedule in the calendar mode.

Referring to FIG. 7, the mobile terminal 100 enters the calendar mode after execution of a calendar application according to a user command or the like.

That is, the mobile terminal 100 displays, on the display unit 151, a calendar screen 719 including a menu bar 711 on which menu items related to the calendar function are arranged, a calendar window 713 for displaying weekly/monthly/yearly schedules, and a schedule window 715 for displaying schedule information corresponding to today or a date selected by the user.

The schedule window 715 may include an identification icon 717 indicating that a memo is linked to the corresponding schedule. Accordingly, the user of the mobile terminal 100 can confirm that a memo created at a time, which is designated as a schedule on the calendar, has been linked to the corresponding schedule on the calendar.

Upon selection of a schedule 719 to which a memo is linked from schedules displayed on the calendar window 713 or selection of an item 716 from the schedule window 715, the mobile terminal 100 displays a detailed schedule screen 720 including information 725 about the memo linked to the selected schedule 716 and 719, on the display unit 151.

When the memo item 725 linked to the corresponding schedule is selected while the detailed schedule screen 720 is displayed, the mobile terminal 100 switches to the memo mode from the calendar mode and then displays the memo list screen 730 including the linked memo item 735 on the display unit 151. Accordingly, the user of the mobile terminal 100 can directly check the content of the memo linked to the corresponding schedule on the calendar without additionally executing the memo application.

FIG. 8 illustrates operation of the mobile terminal to align and display schedules linked to memos in the calendar mode.

Referring to FIG. 8, the mobile terminal 100 displays a calendar screen 810 on the display unit 151 according to a user command or the like.

When a menu item "align" (not shown) is selected according to predetermined user input while the calendar screen 810 is displayed, the mobile terminal 100 displays a list screen 820 on which only schedules linked to memos are aligned chronologically or in alphabetical order, on the display unit 151.

Here, each item displayed on the list screen 820 includes an identification icon 825 indicating linkage of a memo thereto. When a plurality of memos is linked to a specific item 830, a plurality of identification icons 835 can be displayed for the specific item 830.

FIG. 9 illustrates operation of the mobile terminal to display a memo list screen including a memo item linked to the calendar in the memo mode.

Referring to FIG. 9, the mobile terminal 100 displays a memo list screen 910 on the display unit 151 according to a user command or the like. Here, the memo list screen 910 includes one or more memo items 920 and 930 linked to the calendar and provide preview images of the content of the memo items 920 and 930.

The memo items 920 and 930 linked to the calendar include identification icons 925 and 935 for indicating that the memo items are linked to schedules on the calendar. When the memo items 920 and 930 are linked to the same schedule, the memo items 920 and 930 may include identification icons 925 and 935 having the same color or same shape. Here, the identification icons 925 and 935 include an indicator for indicating the calendar application and text information about the title, date or the like of the corresponding schedule.

When the identification icon 925 of the memo item 920 is selected while the memo list screen 910 is displayed, the mobile terminal 100 switches from the memo mode to the calendar mode and then displays a calendar screen 920 including the schedule item 925 linked to the memo item 920 on the display unit 151. Accordingly, the user of the mobile terminal 100 can directly check content of a schedule on the calendar, which corresponds to a memo, without additionally executing the calendar application.

FIG. 10 is a flowchart illustrating operations of the mobile terminal to automatically link information about all events generated at a time which is designated as a schedule on the calendar according to a second embodiment of the present invention.

Referring to FIG. 10, the controller 180 displays the calendar screen on the display unit 151 according to a user command or the like. While the calendar screen is displayed, the controller 180 sets an automatic link mode through user input for a set menu (S1010). Here, the automatic link mode refers to an operation mode of automatically linking information about all events generated at a time designated as a schedule on the calendar to the corresponding schedule.

When the automatic link mode is set, the controller 100 checks whether a predetermined event is initially generated at the time designated as the schedule on the calendar (S1020). Here, the predetermined event is using of the mobile terminal, which is carried out at the time designated as the schedule, and may be web surfing, memo writing, calling, playing a game, message transmission/reception, email transmission/reception and multimedia playback, for example. However, the predetermined event is not limited thereto.

When the predetermined event generated at the time designated as the schedule on the calendar is detected, the controller 180 displays, on the display unit 151, a pop-up window for asking the user whether to link all tasks generated at the time designated as the schedule to the corresponding schedule (S1030). As another embodiment, the controller 180 may display an operation screen corresponding to the initially detected event and then display a predetermined pop-up window thereon.

Upon reception of a linkage request command of the user through the pop-up window (S1040), the controller 180 controls information related to the initially generated event to be automatically linked to the corresponding schedule on the calendar (S1050). Subsequently, the controller 180 performs operation related to the initially generated event according to a control command of the user and links information about the event to the corresponding schedule.

When the linkage request command of the user is not received through the pop-up window (S1040), the controller 180 performs the operation related to the initially generated event according to a control command of the user and then finishes the procedure according to the present invention.

When other events are continuously detected at the time designated as the schedule on the calendar (S1060), the controller 180 returns to step S1050 and repeats operation of performing operations corresponding to the detected events and automatically linking information about the events to the corresponding schedule.

When an event is not detected any more at the time designated as the schedule on the calendar (1060), the controller 180 stores information about all events, linked to the corresponding schedule, in a predetermined memory space (S1070). Accordingly, the user of the mobile terminal 100 can enter the calendar mode and check information about all events linked to the corresponding schedule at a glance.

While confirmation of the user is requested for only the event initially generated at the time designated as the schedule on the calendar in the present embodiment, the present invention is not limited thereto. Accordingly, the mobile terminal according to the present invention may be configured to request a user confirmation process for all events generated as the time designated as the schedule on the calendar.

FIGS. 11 to 14 illustrate operations of the mobile terminal according to the second embodiment of the present invention.

FIG. 11 illustrates operation of the mobile terminal to set the automatic link mode on the calendar screen.

Referring to FIG. 11, the mobile terminal 100 displays a calendar screen 1110 on the display unit 151 according to a user command or the like.

When a menu button (not shown) is selected while the calendar screen 1110 is displayed, the mobile terminal 100 displays a menu window 1120 related to the calendar function in a region of the calendar screen 1110. Here, the menu window 1120 includes an item "move", an item "delete", an item "search", an item "synchronize", an item "select calendar", an item "set" and the like.

When the item "set" 1120 is selected from the menu window 1120, the mobile terminal 100 displays a calendar setting screen 1130 on the display unit 151, as shown in FIG. 11(*c*). Here, the calendar setting screen 1130 includes an automatic link item 1135. Upon selection of the automatic link item 1135 displayed on the calendar setting screen 1130, the mobile terminal 100 sets the calendar operating mode to the automatic link mode.

FIGS. 12 and 13 illustrate operation of the mobile terminal to automatically link information about all events generated at a time designated as a schedule on the calendar.

Referring to FIG. 12, when the aforementioned automatic link mode is set, the mobile terminal 100 executes the memo application according to a user command or the like. Here, the mobile terminal 100 detects the current time when an initial event is generated and then checks whether a schedule corresponding to the detected time is present on the calendar.

It is assumed that the current time detected by the mobile terminal 100 is 4:20 pm Oct. 10, 2013 in the present embodiment. In addition, it is assumed that a schedule "UX PRINCIPLE" from 4 pm to 5 pm Oct. 10, 2013 is preset according to a user command or the like in the mobile terminal 100, as shown in FIG. 12(*a*). Furthermore, it is assumed that execution of the memo application is an event initially generated at a time designated as a schedule on the calendar.

When a schedule corresponding to the current time is present on the calendar, as assumed above, the mobile terminal 100 displays a pop-up window 1220 for asking the user whether to link all tasks generated at the time designated as the schedule to the corresponding schedule, in a region of the memo creation screen 1210.

Upon reception of a linkage request command of the user through the pop-up window 1220, the mobile terminal 100 controls all tasks generated at the designated time to be automatically linked to the corresponding schedule.

When user input is received through a character input window 1215 of a memo creation screen 1210, the mobile terminal 100 displays text generated through the user input on the memo display window 1213.

When a menu item "store" 1230 of a menu bar 1211 is selected after completion of generation of the text, the mobile terminal 100 stores the text in a predetermined memory space and automatically links the text to the corresponding schedule on the calendar.

When other events are continuously detected at the time (for example, between 4 pm and 5 pm) designated as the schedule on the calendar, the mobile terminal 100 repeats an operation of performing operations corresponding to the detected events and then automatically linking information about the events to the corresponding schedule.

For example, English word search, calling to a third person and photographing using a camera are sequentially performed at the time designated as the schedule on the calendar, as shown in FIG. 13, the mobile terminal 100 automatically links information about these events to the corresponding schedule.

FIG. 14 illustrates operation of the mobile terminal to provide information about all events linked to a schedule in the calendar mode.

Referring to FIG. 14, the mobile terminal 100 displays a calendar screen 1410 on the display unit 151 according to a user command or the like. Here, the calendar screen 1410 includes a menu bar 1411, a calendar window 1413 displaying monthly schedules, and a schedule window 1415 displaying schedule information corresponding to today or a date selected by the user.

The schedule window 1415 may include a first schedule 1416, an identification icon 1417 indicating that a memo is linked to the first schedule, a second schedule 1418, and an identification icon 1419 indicating that all generated events are linked to the second schedule. Accordingly, the user of the mobile terminal 100 can confirm that all events generated at a time designated as a schedule on the calendar as well as memos created at the designated time are linked to the corresponding schedule.

Upon selection of the second schedule 1418 displayed on the schedule window 1419 of the calendar screen 1410, the mobile terminal 100 displays a detailed schedule screen 1420 including a link item 1425 of the selected schedule 1418 on the display unit 151.

When the link item 1425 is selected while the detailed schedule screen 1420 is displayed, the mobile terminal 100 switches from the calendar mode to the memo mode and then displays a memo list screen 1430 including information about all events linked to the corresponding schedule 1419, on the display unit 151. Accordingly, the user of the mobile terminal can directly check information about all events generated at the time designated as the schedule on the calendar.

As an example, the mobile terminal 100 can display, on the display unit 151, the memo list screen 1430 including information 1431 about a photographing event, information 1433 about a call event, information 1435 about a word search event, and information 1437 about a memo creation event, as shown in FIG. 14(*c*).

The event items 1431, 1433, 1435 and 1437 linked to the calendar include identification icons for indicating linkage of the event items to the corresponding schedule on the calendar. Here, the identification icon may include an indicator indicating the calendar application and text information about the title or date of the corresponding schedule.

When the item 1431 corresponding to the photographing event is selected from the memo list screen 1430, which is not shown, the mobile terminal 100 can enter a gallery mode including images stored through the photographing event.

When the item 1433 corresponding to the call event is selected from the memo list screen 1430, the mobile terminal 100 can call a person corresponding to the call event.

When the item 1435 corresponding to the word search event is selected from the memo list screen 1430, the mobile terminal 100 can access a website through which word search was performed or execute a dictionary application used for word search.

When the item 1437 corresponding to the memo creation event is selected from the memo list screen 1430, the mobile terminal 100 can display a memo generated at the time designated as the corresponding schedule on the display unit 151.

The mobile terminal configured to automatically link user data on the basis of schedule information of the calendar has been described in detail according to various embodiments of the present invention. A description will be given of a mobile terminal configured to link the memo function to additional service functions other than the calendar function and a method for controlling operations of the mobile terminal according to embodiments of the present invention.

FIG. 15 illustrates operation of the mobile terminal to link the memo function to a location search function.

Referring to FIG. 15, the mobile terminal 100 performs location search according to a user command or the like. Accordingly, the mobile terminal 100 displays, on the display unit 151, a location search screen 1510 including a map image (not shown) including current location information and a search window 1513 for inputting a search word.

When the user inputs a geographical name (e.g. famous restaurant at kyunglidan) that the user desires to search for through the search window 1513 while the location search screen 1510 is displayed, the mobile terminal 100 displays a map image 1511 including location information about the geographical name on the display unit 151.

When information about restaurants related to the searched target has been stored in a memo, as shown in FIG. 15(*a*), the mobile terminal 100 displays a pop-up window 1520 for indicating that the information about restaurants related to the searched target has been stored in the memo, in a region of the location search screen 1510.

Upon reception of user input 1530 for retrieving locations of the restaurants stored in the memo through the pop-up window 1520, the mobile terminal 100 displays, on the location search screen 1510, indicators 1540 indicating locations of the restaurants on the map and a pop-up window 1550 providing road guide to the restaurants.

In this manner, the mobile terminal according to the present invention can not only provide information related to a searched position, which has been prestored in a memo, on a map image but also provide a navigation service for the related information by automatically linking location search to the memo function.

FIG. 16 illustrates operation of the mobile terminal to link the memo function to an address book function.

Referring to FIG. 16, the mobile terminal 100 enters the memo creation mode by executing the memo application according to a user command or the like. Accordingly, the mobile terminal 100 displays, on the display unit 151, a memo creation screen 1610 including a menu bar 1611 on which menu items related to the memo function are arranged, a memo display window 1613 and a character input window 1615.

When user input is received through the character input window 1615 while the memo creation screen 1610 is displayed, the mobile terminal 100 displays text generated through the user input on the memo display window 1613.

When the text generated through the memo display window 1613 includes information about a name 1617 or a telephone number (not shown) of a person registered in an address book, the mobile terminal 100 displays the word 1617 corresponding to the information such that the word 1617 is distinguished from other texts.

Further, when the address book includes event information related to the person corresponding to the word 1617, the mobile terminal 100 may display an indicator 1619 for indicating the event information to the user.

When the word 1617 is selected in this state, the mobile terminal 100 can display a contact list screen (not shown) with respect to the person corresponding to the selected word 1617 on the display unit.

Upon selection of the indicator 1619, the mobile terminal displays, on the display unit 151, the event information related to the person corresponding to the word 1617 and a notification window 1620 displaying applications for transmitting a message of congratulations, as shown in FIG. 16(*b*).

Upon selection of a message application 1621 from the applications displayed on the notification screen 1620, the mobile terminal 100 displays a message creation screen 1630 on the display unit 151, as shown in FIG. 16(*c*). When another application is selected, the mobile terminal performs operation corresponding to the selected application.

In this manner, the mobile terminal can conveniently provide contact information and event information with respect to a person stored in a memo to the user without executing an additional contact application by automatically linking the memo creation function to the address book.

FIG. 17 illustrates operation of the mobile terminal to link the memo function to a dictionary function.

Referring to FIG. 17, the mobile terminal 100 executes a dictionary application according to a user command or the like. Here, the dictionary application can be executed through an additional dictionary icon or executed by accessing a specific website using a web icon.

When the same word is searched a predetermined number of times through an execution screen 1710 of the dictionary application, the mobile terminal 100 displays a pop-up window 1720 for asking the user whether to store the searched word in a memo, on the display unit 151.

Upon reception of user input 1730 for requesting addition of the corresponding word to a memo through the pop-up window 1720, the mobile terminal 100 displays a memo creation screen 1740 including search results with respect to the searched word on the display unit 151.

In this manner, the mobile terminal can conveniently store words frequently searched by the user in a memo without additionally executing the memo application by automatically linking word search to the memo function.

While the present embodiment describes linking of the location search function, address book function and the dictionary function to the memo function, the present invention is not limited thereto. Therefore, it will be obvious to a person skilled in the art that other various additional service functions can be linked to the memo function.

A description will be given of a mobile terminal configured to provide an easier and more convenient memo function on the basis of a new user interface environment and a method for controlling operations of the mobile terminal according to an embodiment of the present invention.

FIG. 18 illustrates the configuration of the memo application according to an embodiment of the present invention.

Referring to FIG. 18(*a*), the mobile terminal 100 executes the memo application according to predetermined user input and displays a memo creation screen 1830 on the display unit 151. Here, the predetermined user input may be user input of pressing a hot key 1810 provided to one side of the mobile terminal 100 or user input for selecting an icon (not shown) or a widget 1820 corresponding to the memo application displayed on a home screen.

In addition, the mobile terminal 100 may directly enter the memo creation mode through the hot key 1810 without performing an unlocking process in a power off state. After completion of memo creation, the mobile terminal 100 returns to the screen lock state.

The memo creation screen 1830 may include a menu bar 1811 on which menu items related to the memo function are arranged, a memo display window 1813 displaying text generated by the user or an inserted image, a meta information window 1835 including additional information corresponding to weather, location, time and content attached to a memo, and a character input window 1815. Here, the meta information window 1835 can be configured to be deleted according to user setting and/or command.

When a menu item "store" (not shown) of the menu bar 1811 is selected after creation of a memo through the memo creation screen 1830, the mobile terminal 100 displays a memo list screen 1840 including preview images corresponding to content of stored memo items on the display unit 151. Accordingly, the user of the mobile terminal can scan content of all created memos at a glance without selecting each item of the memo list.

FIGS. 19A and 19B illustrate operation of the mobile terminal to capture content of a desired webpage and to insert the captured content into a memo during web surfing.

Referring to FIG. 19A, the mobile terminal 100 drives a web browser according to user command or the like and then accesses a desired website and performs web surfing. When the user discovers a webpage screen 1910 that the user wants to capture and copy into a memo during web surfing, the user can capture the webpage screen 1910 and insert the captured image into the memo.

For example, a predetermined hot key is selected while the webpage screen 1910 is displayed, the mobile terminal 100 captures content of the webpage screen 1910 currently displayed on the display unit 151 and then enters the memo creation mode. Then, the mobile terminal 100 inserts a capture image 1925 corresponding to the content into a memo creation screen 1920.

In this state, when a capture menu 1930 displayed at the top of the memo creation screen 1920 is selected, the mobile terminal 100 displays a thumbnail image 1950 corresponding to the content of the webpage screen 1910, on the display unit 151.

Referring to FIG. 19B, when a region 1955 to be captured is designated through touch-and-drag input applied to the thumbnail image 1950 and then a completion icon 1945 is selected, the mobile terminal 100 displays a pop-up window 1960 for designating a place to store the image 1955 corresponding to the selected capture region, on the display unit 151.

Here, the pop-up window 1960 may include a memo item 1961 and a gallery item 1963 as places to store the selected capture image 1955. Accordingly, at least one of a memo and a gallery can be determined as a place to store the capture image 1955 by selecting the items 1961 and 1963. As another embodiment, the memo is selected by default and provided to the pop-up window 1960.

In addition, the pop-up window 1960 may further include items 1965 and 1967 for selecting whether to use the selected storage place only once or continuously.

When the items 1961 and 1965 for continuously selecting "memo" as a place to store the capture image 1955 is selected through the pop-up window 1960, as shown in FIGS. 19(*e*) and 19(*f*), the mobile terminal 100 inserts the capture image 1955 into a memo creation screen 1970. In addition, the mobile terminal displays information about the source (i.e. URL information of the corresponding webpage) of the captured image and information about the current weather, location, time and the like on a meta information window 1980 provided to the lower end of the memo creation screen 1970.

When the menu item "store" displayed at the top of the memo creation screen 1970 is selected after completion of the aforementioned web clipping procedure, the mobile terminal 100 stores the created memo in a predetermined memory space and then displays the webpage screen 1910 on the display unit 151 again.

While the current embodiment describes the operation of capturing the webpage screen currently displayed on the display unit and inserting the captured image into a memo when a predetermined hot key is selected, the present invention is not limited thereto. As another embodiment, entire content of the webpage screen can be captured and inserted into a memo upon selection of the hot key. In this state, a desired region of the entire webpage screen can be selected and stored in a memo by selecting the menu "capture" 1930.

FIG. 20 illustrates operation of the mobile terminal to capture content of a webpage screen, insert a captured image into a memo and then edit a text.

Referring to FIG. 20, when a predetermined hot key is selected while a predetermined webpage screen (not shown) is displayed, the mobile terminal 100 captures content of the webpage screen currently displayed on the display unit 151*a* and then enters the memo creation mode. In addition, the mobile terminal 100 inserts a capture image 2015 corresponding to the content into a memo creation screen 2010.

Subsequently, when a menu item "text" 2020 displayed at the top of the memo creation screen 2010 is selected, the mobile terminal 100 displays, on the memo creation screen 2010, a space 2030 for inputting predetermined text and a character input window 2035 under the inserted capture image 2015. Accordingly, the user can create a memo related to the capture image 2015 in the space 2030.

When the menu item "store" (not shown) displayed at the top of the memo creation screen 2010 after completion of creation of the memo, the mobile terminal stores the created memo in a predetermined memory space and then displays the webpage screen 2040 on the display unit 151 again.

FIG. 21 illustrates operation of the mobile terminal to switch from the memo mode to a camera mode.

Referring to FIG. 21, the mobile terminal 100 displays a memo list screen 2110 on the display unit 151 according to a user command or the like.

When a menu item "camera" 2115 displayed at the top of the memo creation screen 2110 while the memo creation screen 2110 is displayed, the mobile terminal 100 displays a preview image 2120 input through the camera 121 on the display unit 151 immediately after switching from the memo mode to the camera mode. In addition, the mobile terminal 100 automatically sets brightness, contrast, white balance, focus and the like to be suited to text photographing when entering the camera mode.

When the direction of a lens of the camera 121 is adjusted to a direction in which an object (for example, a white board) to be photographed and then a "photograph" button 2125 is selected, the mobile terminal 100 photographs the object and then switches from the camera mode to the memo mode. Here, the mobile terminal 100 displays a memo list screen 2110 including a photographed image 2130 on the display unit 151. In addition, the mobile terminal 100 may store the photographed image 2130 in a gallery as well as a memo according to user setting.

When photographing is performed using the camera in the memo mode, the mobile terminal 100 can enter a mode in which text input through the camera can be automatically recognized. Accordingly, the automatically recognized text can be stored in a predetermined database and configured to be searchable later.

FIG. 22 illustrates operation of the mobile terminal to provide a memo list screen in which the size of a preview image is dynamically varied according to the quantity of content stored in a memo item.

Referring to FIG. 22(*a*), the mobile terminal 100 displays a default memo list screen 2210 set according to a user command or the like on the display unit 151.

Here, in the default memo list screen 2210, the size of a preview image corresponding to each memo item is dynamically changed according to the quantity of content stored in each memo item. In the case of a first memo item 2211, for example, a preview image 2211 corresponding to the first memo item is displayed larger since the quantity of content stored in the first memo item is large. In the case of a second memo item 2213, a preview image 2213 corresponding to the second memo item is displayed smaller since the quantity of content stored in the second memo item is small.

When meta information is present in at least one memo item, the default memo list screen 2210 includes the meta information displayed at the lower part of a preview image related to the corresponding memo item.

Referring to FIG. 22(*b*), a memo list screen 2220 for providing preview images with respect to content of memo items may be displayed on the display unit 151 according to a user command or the like without display of meta information.

Referring to FIG. 22(*c*), a memo list screen 2230 on which preview images having the same size are arranged in a row according to a user command or the like irrespective of the quantity of content stored in each memo item, may be displayed on the display unit 151.

Further, a preview image corresponding to each memo item may be moved to a position that the user desires using touch-and-drag input through the memo list screen, which is not shown in the figure.

FIG. 23 illustrates operation of the mobile terminal to scroll a memo creation screen according to predetermined user input.

Referring to FIG. 23, the mobile terminal 100 displays a memo creation screen 2310 including a predetermined text and images on the display unit 151.

When user input 2320 of multi-touching the screen using two fingers of the user and then dragging touch is received while the memo creation screen 2310 is displayed, the mobile terminal 100 scrolls the memo creation screen 2310 in the drag direction of the received user input 2320.

As another embodiment, upon reception of user input 2340 of touching the boundary (or bezel 2330) of the memo creation screen 2310 and the dragging touch, the mobile terminal 100 scrolls the memo creation screen 2310 in the drag information of the received user input 2340. In this manner, the mobile terminal can scroll the memo creation screen in response to predetermined user input.

FIG. 24 illustrates operation of the mobile terminal to provide a guideline for a page to be output to a printer in the memo creation mode.

Referring to FIG. 24, the mobile terminal 100 displays a memo creation screen 2410 including predetermined text and images on the display unit 151.

When a menu item "set" 2420 displayed on a menu bar is selected while the memo creation screen 2410 is displayed, the mobile terminal 100 displays, on the display unit 151, a setting screen 2430 including a handwriting item 2431, a print option item 2433, a sound option item 2435 and the like.

When a guideline item included in the print option 2433 is selected on the setting screen 2430, the mobile terminal 100 can display an indicator 2440 for indicating a region of a page, which will be printed through a printer, on the memo creation screen 2410. Accordingly, the user can easily check the page region to be printed through the printer using the indicator 2440.

FIG. 25 illustrates operation of the mobile terminal to align items stored in memos by groups using meta information.

Referring to FIG. 25, the mobile terminal 100 displays a memo list screen 2510 on the display unit 151 according to a user command or the like.

When a menu item "align" (not shown) displayed at the top of the memo list screen 2510 is selected while the memo list screen 2510 is displayed, the mobile terminal 100 displays an alignment screen 2520 on which multiple items stored in memos are automatically aligned, on the display unit 151. Here, the mobile terminal 100 can automatically align the items by groups using meta information stored therein.

Referring to FIG. 25(b), the alignment screen 2502 displayed on the display unit 151 can include a capture group 2521, a memo camera group 2522, a calendar linked group 2523, a user generated group 2524, a locked memo group 2525, a bookmark group 2526 and the like. However, the present invention is not limited thereto.

Upon selection of a menu item "edit" 2530 displayed at the top of the alignment screen 2520, the mobile terminal 100 displays an editing screen 2540 for modifying the alignment screen 2520 on the display unit 151. Accordingly, the user can conveniently correct the name of each group and memo items included in corresponding groups.

In addition, upon selection of a menu item "add" 2550 displayed at the top of the editing screen 2540, the mobile terminal 100 displays a pop-up window 2560 for generating a new memo group on the display unit 151. Accordingly, the user can generate a new group through the pop-up window 2560 and then add the new group to the alignment screen 2520.

FIG. 26 illustrates operation of the mobile terminal to provide a to-do list item in a memo creation mode.

Referring to FIG. 26, the mobile terminal displays a memo creation screen 2610 on the display unit 151 according to a user command or the like.

When a menu item "to-do list" 2615 displayed at the top of the memo creation screen 2610 is selected while the memo creation screen 2610 is displayed, the mobile terminal 100 displays, on the display unit 151, a check box 2620 for indicating whether a task that the user wants to do has been accomplished. Accordingly, the user records tasks 2625 to accomplish at intervals after the check box 2620.

Upon selection of an "enter" key 2635 displayed on a character input window 2630, the mobile terminal 100 generates a check box for generating the next item. Upon completion of memo creation for a to-do list through this procedure, the mobile terminal 100 checks an item that has already been accomplished from among the generated items. Accordingly, the user can easily check whether tasks recorded in memos have been accomplished through an indicator indicated on the check box 2620.

The present invention may be implemented as code that can be written to a computer-readable recording medium and can thus be read by a computer. The computer-readable recording medium may be any type of recording device in which data can be stored in a computer-readable manner. Examples of the computer-readable medium include HDD (Hard Disk Drive), SSD (Solid State Disk), SDD (Silicon Disk Drive), ROM, RAM, CD-ROM, a magnetic tape, a floppy disk, an optical data storage device, and the other types of storage media presented herein. If desired, the computer-readable medium may be realized in the form of a carrier wave (for example, a transmission over the Internet). The computer may include the controller 180 of the mobile terminal. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A mobile terminal, comprising:
a display unit; and
a controller configured to:
 enter a memo creation mode by executing a memo application;
 cause the display to display an operating screen for generating a memo;
 detect a memo creation time and check whether a schedule corresponding to the memo creation time is present in a calendar in response to an input for storing the generated memo;
 cause the display to display a pop-up window at a portion of the operating screen when the schedule is present in the calendar, wherein the pop-up window inquires whether to link the memo to the schedule present in the calendar; and
 cause information about the memo to be linked to the schedule in response to an input received via the pop-up window.

2. The mobile terminal of claim 1, wherein:
the input received via the pop-up window is a linkage request command of a user; and
the controller is further configured to cause the display to display a memo list screen including one or more memo items, one of the one or more memo items being a memo item linked to the schedule of the calendar such that the linked memo item is distinguished from other memo items among the one or more memo items.

3. The mobile terminal of claim 2, wherein memo items linked to a same schedule of the calendar among the one or more memo items are displayed in a same color or same shape.

4. The mobile terminal of claim 2, wherein the memo list screen further includes a preview image showing content corresponding to each memo item.

5. The mobile terminal of claim 4, wherein a size of the preview image is dynamically varied according to a quantity of content corresponding to each memo item.

6. The mobile terminal of claim 1, wherein the pop-up window further inquires about whether to link information about all events occurred within a time designated as the schedule to the schedule.

7. The mobile terminal of claim 6, wherein the controller is further configured to cause the display to display a memo list screen including items corresponding to the information about all events linked to the schedule of the calendar in response to the input received via the pop-up window.

8. The mobile terminal of claim 7, wherein the controller is further configured to perform an event corresponding to a memo item when the memo item is selected from among the items displayed on the memo list screen.

9. A method for controlling a mobile terminal, the method comprising:
    entering a memo creation mode by executing a memo application;
    displaying an operating screen for generating a memo on a display;
    detecting a memo creation time and checking whether a schedule corresponding to the memo creation time is present in a calendar in response to an input for storing the generated memo;
    displaying a pop-up window at a portion of the operating screen when the schedule is present in the calendar, wherein the pop-up window inquires whether to link the memo to the schedule present in the calendar; and
    linking information about the memo to the schedule in response to an input received via the pop-up window.

10. The method of claim 9, further comprising:
    displaying a memo list screen including one or more memo items, one of the one or more memo items being a memo item linked to the schedule of the calendar, such that the linked memo item is distinguished from other memo items among the one or more memo items,
    wherein the input received via the pop-up window is a linkage request command of a user.

11. The method of claim 10, wherein memo items linked to a same schedule of the calendar among the one or more memo items are displayed in a same color or same shape.

12. The method of claim 10, wherein the memo list screen further includes a preview image showing content corresponding to each memo item.

13. The method of claim 12, wherein a size of the preview image is dynamically varied according to a quantity of content corresponding to each memo item.

14. The method of claim 9,
    wherein the pop-up window further inquires about whether to link information about all events occurred within a time designated as the schedule to the schedule.

15. The method of claim 14, further comprising:
    displaying, on the display, a memo list screen including items corresponding to the information about all events linked to the schedule of the calendar in response to the input received via the pop-up window.

16. The method of claim 15, further comprising:
    performing an event corresponding to a memo item when the memo item is selected from among the items displayed on the memo list screen.

* * * * *